(12) United States Patent
Lau et al.

(10) Patent No.: US 12,681,221 B2
(45) Date of Patent: Jul. 14, 2026

(54) AXISYMMETRIC HEATING ASSEMBLY LAYOUT WITH DOUBLE ENDED LAMP

(71) Applicant: Applied Materials, Inc., Santa Clara, CA (US)

(72) Inventors: Shu-Kwan Lau, Sunnyvale, CA (US); Enle Choo, Saratoga, CA (US); Danny Don Wang, Saratoga, CA (US); Shainish Nellikka, Bangalore (IN); Toshiyuki Nakagawa, Narita (JP); Zhiyuan Ye, San Jose, CA (US); Abhishek Dube, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1092 days.

(21) Appl. No.: 17/725,010

(22) Filed: Apr. 20, 2022

(65) Prior Publication Data

US 2022/0397706 A1 Dec. 15, 2022

(30) Foreign Application Priority Data

Jun. 9, 2021 (IN) .............................. 202141025609

(51) Int. Cl.
*G02B 5/09* (2006.01)
*H05B 3/00* (2006.01)
(52) U.S. Cl.
CPC .............. *G02B 5/09* (2013.01); *H05B 3/0047* (2013.01)
(58) Field of Classification Search
CPC ... G02B 5/09; H05B 3/0047; H01L 21/68742; H01L 21/67115
See application file for complete search history.

(56) References Cited

U.S. PATENT DOCUMENTS

| | | | |
|---|---|---|---|
| 4,859,832 A | 8/1989 | Uehara et al. | |
| 6,081,072 A | 6/2000 | Suzuki | |
| 6,228,174 B1 * | 5/2001 | Takahashi | C23C 16/46 |
| | | | 118/724 |
| 6,476,362 B1 | 11/2002 | Deacon et al. | |
| 9,431,279 B2 | 8/2016 | Kim et al. | |

(Continued)

FOREIGN PATENT DOCUMENTS

| | | |
|---|---|---|
| EP | 1197989 A2 | 4/2002 |
| JP | H11176389 A | 7/1999 |

(Continued)

OTHER PUBLICATIONS

Translation of JP-2018181925-A (Year: 2018).*

(Continued)

*Primary Examiner* — Elizabeth M Kerr
(74) *Attorney, Agent, or Firm* — Patterson + Sheridan, LLP

(57) ABSTRACT

Apparatus for heating a substrate within a substrate processing chamber are described herein. More specifically, possible lamp modules for use within a substrate processing chamber are described. The lamp modules include a reflector body. The reflector body is a reflective material. The reflector body includes grooves disposed in a surface and configured to direct radiant energy towards a substrate. Each ring includes multiple grooves with different cross sections to allow radiant energy to be directed at different radial positions on the substrate from the same ring. The grooves may be either curved or linear grooves.

20 Claims, 8 Drawing Sheets

(56)    References Cited

U.S. PATENT DOCUMENTS

| | | | |
|---|---|---|---|
| 9,863,038 | B2 | 1/2018 | Ewert et al. |
| 10,132,003 | B2 | 11/2018 | Lau et al. |
| 2002/0104205 | A1* | 8/2002 | Goodwin .......... H01L 21/67115 |
| | | | 29/25.01 |
| 2008/0152328 | A1 | 6/2008 | Okabe et al. |
| 2012/0145697 | A1* | 6/2012 | Komatsu ........... H01L 21/68792 |
| | | | 219/438 |
| 2013/0298832 | A1 | 11/2013 | Ranish et al. |
| 2014/0091079 | A1 | 4/2014 | Ueshima |
| 2015/0071623 | A1 | 3/2015 | Ranish |
| 2018/0023214 | A1 | 1/2018 | Lau et al. |
| 2020/0022223 | A1 | 1/2020 | Ranish |

FOREIGN PATENT DOCUMENTS

| | | | |
|---|---|---|---|
| JP | 2003059853 A | | 2/2003 |
| JP | 2006147943 A | | 6/2006 |
| JP | 2008182180 A | | 8/2008 |
| JP | 2009212185 A | | 9/2009 |
| JP | 2018181925 A | * | 11/2018 |
| JP | 2019523554 A | | 8/2019 |
| KR | 20140018915 A | | 2/2014 |
| KR | 20190022912 | | 3/2019 |
| WO | 2018017587 A1 | | 1/2018 |

OTHER PUBLICATIONS

Office Action for Japanese Application No. 2023-563900 dated Nov. 5, 2024.

International Search Report and Written Opinion for International Application No. PCT/US2022/025579 dated Aug. 9, 2022.

Office Action for Korean Application No. 10-2023-7035639 dated Jan. 15, 2025.

Office Action for Korean Application No. 10-2023-7035639 dated Nov. 10, 2025.

Office Action for Taiwan Application No. 111116616 dated Nov. 19, 2025.

Search Report for Taiwan Application No. 111116616 dated Nov. 10, 2025.

Extended European search report for European Application No. 22820736.1 dated Sep. 22, 2025.

* cited by examiner

AXISYMMETRIC HEATING ASSEMBLY LAYOUT WITH DOUBLE ENDED LAMP

CROSS-REFERENCE TO RELATED APPLICATIONS

This application claims benefit of Indian provisional patent application serial number 202141025609, filed Jun. 9, 2021, which is herein incorporated by reference in its entirety.

BACKGROUND

Field

Embodiments of the present disclosure generally relate to apparatus and methods for fabricating semiconductor devices. More specifically, apparatus disclosed herein relate to lamp head and reflector assemblies within a semiconductor processing chamber.

Description of the Related Art

Semiconductor substrates are processed for a wide variety of applications, including the fabrication of integrated devices and microdevices. During processing, the substrate is positioned on a susceptor within a process chamber. The susceptor is supported by a support shaft, which is rotatable about a central axis. Precise control over a heating source is preferred to uniformly heat the substrate within strict tolerances. The temperature of the substrate can affect the uniformity of the material deposited on the substrate.

The ability to precisely control substrate temperatures within the process chamber has a significant impact throughput and production yields. Conventional process chambers have difficulty meeting temperature control criteria needed to fabricate next generation devices while meeting ever increasing demands for improved production yields and faster throughput. Conventional process chambers also utilize uneven power distribution across the substrate. The temperature cycling of the substrate caused by uneven power distribution can damage or warp the substrate while also increasing the likelihood of different lamps burning out over a wider time range.

Therefore, a need exists for improved process chambers and lamp module apparatus which enable even heating of a substrate, reduced temperature cycling, and increased lamp life.

SUMMARY

The present disclosure generally relates to apparatus for substrate processing, such as lamp assemblies for heating a substrate during deposition processes. In one embodiment, a lamp module for substrate processing is described. The lamp module includes a reflector body, one or more first grooves disposed within a first surface of the reflector body, and one or more second grooves disposed within the first surface of the reflector body. Each of the first grooves are configured to receive a lamp. Each of the second grooves are also configured to receive a lamp. The one or more first grooves and the one or more second grooves form a first ring of grooves. A cross sectional shape of the one or more first grooves is different than a cross sectional shape of the one or more second grooves.

In another embodiment, another lamp module for substrate processing is described. The lamp module includes a reflector body, one or more first grooves disposed within a first surface of the reflector body, one or more second grooves disposed within the first surface of the reflector body, one or more third grooves disposed within the first surface of the reflector body, and one or more fourth grooves disposed within the first surface of the reflector body. Each of the first grooves are configured to receive one or more linear lamps. Each of the second grooves are configured to receive one or more linear lamps. The one or more first grooves and the one or more second grooves are oriented to form at least a portion of a first ring while the one or more third grooves and the one or more fourth grooves are oriented to form at least a portion of a second ring circumscribing the first ring.

In another embodiment, another lamp module for substrate processing is described. The lamp module includes a reflector body, one or more first grooves disposed within a first surface of the reflector body, one or more second grooves disposed within the first surface of the reflector body, one or more third grooves disposed within the first surface of the reflector body, and one or more fourth grooves disposed within the first surface of the reflector body. The one or more first grooves and the one or more second grooves are oriented to form at least a portion of a first ring. The one or more third grooves and the one or more fourth grooves are oriented to form at least a portion of a second ring circumscribing the first ring. The one or more first grooves have a different cross sectional shape than the one or more second grooves.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to lamp head and reflector assemblies within a semiconductor processing chamber. More specifically, the semiconductor processing chamber is a deposition chamber or an epitaxial deposition chamber. The lamp head and reflector assemblies as described herein include either linear or curved lamps arranged in an axisymmetric layout. Different lamp layouts and reflector configurations are described herein which beneficially reduce temperature cycling on substrates processed within the processing chamber, are more adjustable, improve temperature uniformity on stationary chamber components, and enable better window cooling. By arranging linear lamps in a circular pattern, temperature cycling of the substrate is reduced as heating may be performed almost continuously on similar radial positions of the substrate. In arrangements wherein the heating is not continuous along the same radial position, the lamps and reflectors are arranged to reduce the number of heating zones each position on the substrate passes through.

Figure 1:
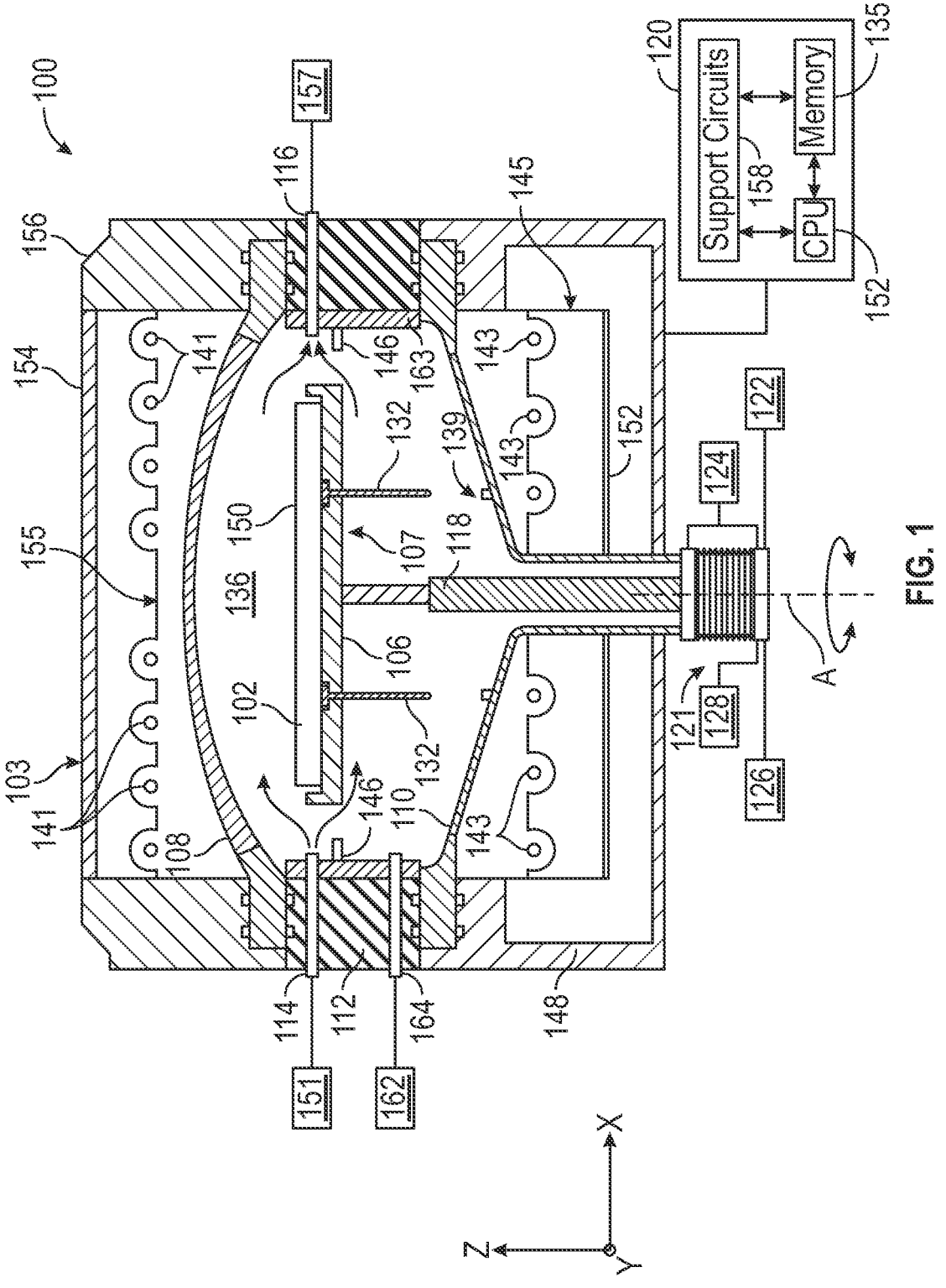
FIG. 1 is a schematic illustration of a deposition chamber, according to embodiments of the present disclosure.

FIG. 1 is a schematic illustration of a deposition chamber 100 according to embodiments of the present disclosure. The deposition chamber 100 is an epitaxial deposition chamber. The deposition chamber 100 is utilized to grow an epitaxial film on a substrate, such as the substrate 102. The deposition chamber 100 creates a cross-flow of precursors across the top surface 150 of the substrate 102.

The deposition chamber 100 includes an upper body 156, a lower body 148 disposed below the upper body 156, a flow module 112 disposed between the upper body 156 and the lower body 148. The upper body 156, the flow module 112, and the lower body 148 form a chamber body. Disposed within the chamber body is a substrate support 106, an upper window 108, a lower window 110, a plurality of upper lamps 141, and a plurality of lower lamps 143. As shown, the controller 120 is in communication with the deposition chamber 100 and is used to control processes, such as those described herein. The substrate support 106 is disposed between the upper window 108 and the lower window 110. The plurality of upper lamps 141 are disposed between the upper window 108 and a lid 154. The plurality of upper lamps 141 form a portion of the upper lamp module 155. The lid 154 may include a plurality of sensors (not shown) disposed therein for measuring the temperature within the deposition chamber 100. The plurality of lower lamps 143 are disposed between the lower window 110 and a floor 152. The plurality of lower lamps 143 form a portion of a lower lamp module 145. The upper window 108 is an upper dome and is formed of an energy transmissive material, such as quartz. The lower window 110 is a lower dome and is formed of an energy transmissive material, such as quartz.

A processing volume 136 is formed between the upper window 108 and the lower window 110. The processing volume 136 has the substrate support 106 disposed therein. The substrate support 106 includes a top surface on which the substrate 102 is disposed. The substrate support 106 is attached to a shaft 118. The shaft is connected to a motion assembly 121. The motion assembly 121 includes one or more actuators and/or adjustment devices that provide movement and/or adjustment of the shaft 118 and/or the substrate support 106 within the processing volume 136. The motion assembly 121 includes a rotary actuator 122 that rotates the shaft 118 and/or the substrate support 106 about a longitudinal axis A of the deposition chamber 100. The motion assembly 121 further includes a vertical actuator 124 to lift and lower the substrate support 106 in the z-direction. The motion assembly includes a tilt adjustment device 126 that is used to adjust the planar orientation of the substrate support 106 and a lateral adjustment device 128 that is used to adjust the position of the shaft 118 and the substrate support 106 side to side within the processing volume 136.

The substrate support 106 may include lift pin holes 107 disposed therein. The lift pin holes 107 are sized to accommodate a lift pin 132 for lifting of the substrate 102 from the substrate support 106 either before or after a deposition process is performed. The lift pins 132 may rest on lift pin stops 134 when the substrate support 106 is lowered from a processing position to a transfer position.

The flow module 112 includes a plurality of process gas inlets 114, a plurality of purge gas inlets 164, and one or more exhaust gas outlets 116. The plurality of process gas inlets 114 and the plurality of purge gas inlets 164 are disposed on the opposite side of the flow module 112 from the one or more exhaust gas outlets 116. One or more flow guides 146 are disposed below the plurality of process gas inlets 114 and the one or more exhaust gas outlets 116. The flow guide 146 is disposed above the purge gas inlets 164. A liner 163 is disposed on the inner surface of the flow module 112 and protects the flow module 112 from reactive gases used during deposition processes. The process gas inlets 114 and the purge gas inlets 164 are positioned to flow a gas parallel to the top surface 150 of a substrate 102 disposed within the processing volume 136. The process gas inlets 114 are fluidly connected to a process gas source 151. The purge gas inlets 164 are fluidly connected to a purge gas source 162. The one or more exhaust gas outlets 116 are fluidly connected to an exhaust pump 157.

Figure 2A:
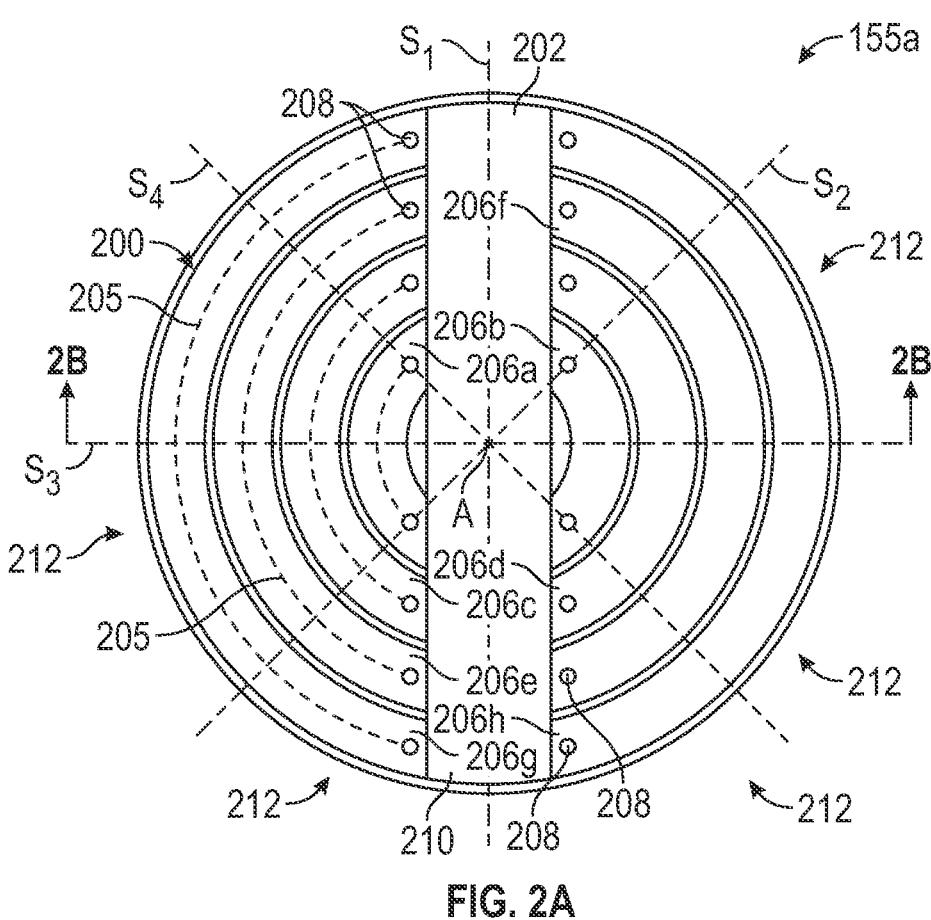
FIG. 2A illustrates a bottom plan view of a first embodiment of an upper lamp module, according to embodiments of the present disclosure.

FIG. 2A illustrates a bottom plan view of a first embodiment of an upper lamp module 155*a*. The upper lamp module 155*a* includes a reflector body 200 and a plurality of upper lamps 141 (FIG. 1). The reflector body 200 includes a plurality of grooves formed in the bottom surface 202. The bottom surface 202 may be described as a first surface of the reflector body 200. A top surface 203 (FIG. 2B) is disposed opposite the bottom surface 202 and may be described as a second surface. The top surface 203 is parallel to the bottom surface 202. The bottom surface 202 includes a plurality of grooves 206*a*-206*h*.

Each of the plurality of grooves 206a-206h are configured to hold a horizontal lamp extending along the direction of each of the grooves 206a-206h. The walls 216 of each of the plurality of grooves 206a-206h have a generally elliptical, round, parabolic, or ovoid cross section and are configured to direct energy emitted by a lamp towards a substrate within the deposition chamber 100.

In some embodiments, the reflector body 200 is formed of a reflective material, such as aluminum or steel. In some embodiments, the reflector body 200 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 200 is formed of the second material. The bottom surface 202 may have a reflectance of greater than about 90%, such as greater than about 98% for wavelengths between about 700 nm to about 15000 nm, such as about 700 nm to about 1000 nm or about 1000 nm to about 15000 nm. The bottom surface 202 is made from or coated with the second material.

The plurality of grooves 206a-206h are arranged to form portions of concentric rings along the bottom surface 202. In the embodiment of FIG. 2A, a first groove 206a and a second groove 206b form a first ring. A third groove 206c and a fourth groove 206d form a second ring. A fifth groove 206e and a sixth groove 206f form a third ring. A seventh groove 206g and an eighth groove 206h form a fourth ring. The second ring circumscribes the first ring and is concentric with the first ring. The third ring circumscribes the second ring and is concentric with the second ring. The fourth ring circumscribes the third ring and is concentric with the third ring. As shown herein, each of the plurality of grooves 206a-206h forms a semicircle, such that the first groove 206a forms a first semicircle, the second groove 206b forms a second semicircle, the third groove 206c forms a third semicircle, the fourth groove 206d forms a fourth semicircle, and so on. In alternative embodiments, each of the plurality of grooves 206a-206h do not form full semicircles, and instead form less than 50% of a circle, such as an arc extending less than 180 degrees around a central axis. Each of the plurality of grooves 206a-206h may also form less than 40% of a circle, such as an arc extending less than about 145 degrees around a central axis. Each of the plurality of grooves 206a-206h may also form about 30% to about 35% of a circle, such as an arc extending about 105 degrees to about 130 degrees around a central axis. Each of the plurality of grooves 206a-206h may also form less than about 30% of a circle, such as an arc extending less than 105 degrees around a central axis. Each of the plurality of grooves 206a-206h may also form about 20% to about 29% of a circle, such as an arc extending about 70 degrees to about 100 degrees around a central axis. Each of the plurality of grooves 206a-206h are curved grooves and extend along a curved length.

Each of the grooves 206a-206h has at least one hole 208 formed therethrough. The hole 208 extends from a bottom of one of the grooves 206a-206h to the top surface 203 and enables an electrical connection of a lamp to be disposed therethrough. As shown herein, each of the grooves 206a-206h includes at least two holes 208, such as two holes 208. Each of the holes 208 are located proximate to the distal ends of the grooves 206a-206h, such that one hole 208 is located at one distal end of one of the grooves 206a-206h and a second hole 208 is located at the opposite distal end of the same groove 206a-206h. In addition to providing electrical support, the holes 208 may serve to allow for mechanical support of the lamps disposed within each of the grooves 206a-206h. Each of the lamps within the grooves 206a-206h includes a filament 205 (four are shown, in phantom, for clarity). The filament 205 is shown in some of the grooves 206a-206h herein and illustrates the location of a linear lamp filament relative to each of the grooves 206a-206h. The filament 205 is disposed between two holes 208 formed in the grooves 206a-206h.

The grooves 206a-206h are split into at least two portions. As shown in FIG. 2A, the grooves 206a-206h are split into two halves across a first section plane $S_1$. Splitting the grooves 206a-206h enables the grooves on either side of the first section plane $S_1$ to have a different cross-sectional shape and be configured to orient energy from a lamp towards a different radial position on a substrate. A divider 210 is disposed between a first half and a second half. The first half is formed by the first groove 206a, the third groove 206c, the fifth groove 206e, and the seventh groove 206g. The second half is formed by the second groove 206b, the fourth groove 206d, the sixth groove 206f, and the eighth groove 206h. The divider 210 is a planar surface between the two halves. The divider 210 may protrude from the bottom surface 202 or be in line with the bottom surface 202. The divider 210 may have one or more holes or openings disposed therethrough for one or more of a pyrometer, a spot heating device, a cooling gas channel, or a heating gas channel. The length of the divider 210 across the bottom surface 202 additionally enables the pyrometer aperture to be used to measure the temperature at multiple locations along a substrate or the substrate support 106.

Additional section planes $S_2$, $S_3$, and $S_4$ are disposed through the reflector body 200. The additional section planes $S_2$, $S_3$, and $S_4$ are shown to illustrate additional locations where dividers, similar to the divider 210 could be located and the grooves 206a-206h split to form smaller grooves. The second section plane $S_2$ is disposed at an angle between about 30 degrees and about 70 degrees from the first section plane $S_1$. The third section plane $S_3$ is disposed at about a 90 degree angle from the first section plane $S_1$. The fourth section plane $S_4$ is disposed at an angle between about −30 degrees and about −70 degrees from the first section plane $S_1$. If the grooves 206a-206h are split across the third section plane $S_3$ in addition to across the first section plane $S_1$, the grooves 206a-206h form quarter circles, or curves smaller than quarter circles. The grooves 206a-206h may further be split across the second section plane $S_2$ and the fourth section plane $S_4$. The grooves 206a-206h may therefore be split to form less than 13% of a circle, such as $\frac{1}{8}^{th}$ circles. The section planes $S_1$, $S_2$, $S_3$, and $S_4$ therefore split the reflector body 200 into sections 212, wherein each section 212 is a sector or pie-shape.

In some embodiments, each of the grooves 206a-206h comprises further subsection grooves, such that each of the one or more grooves 206a-206h includes multiple subsections, such as one groove subsection, two groove subsections, three groove subsections, four groove subsections, or five groove subsections. The number of separate grooves or groove subsections comprising each of the first groove 206a, the second groove 206b, the third groove 206c, the fourth groove 206d, the fifth groove 206e, the sixth groove 206f, the seventh groove 206g, or the eighth groove 206h varies depending on the desired radiation distribution on the substrate. In some embodiments, the individual grooves forming the grooves 206a-206h are connected to form a single groove, but the cross section of the groove changes at a section line, such as one of the first section plane $S_1$, the second section plane $S_2$, the third section plane $S_3$, or the fourth section plane $S_4$. In this embodiment, the multiple individual grooves forming the grooves 206a-206h are still referenced as individual grooves, but are actually a single continuous groove with a changing cross section.

Figure 2B:
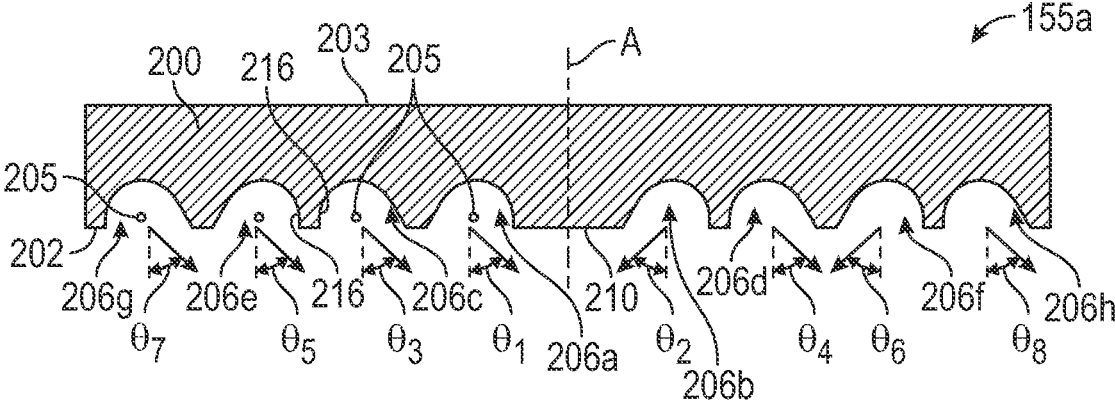
FIG. 2B illustrates a cross-sectional view of the first embodiment of the upper lamp module, according to embodiments of the present disclosure.

FIG. 2B illustrates a cross-sectional view of the first embodiment of the upper lamp module 155a. The cross-section is taken along the plane 2B-2B and splits the reflector body 200 in half. Each of the grooves 206a-206h are centered around the axis A. Each of the grooves 206a-206h are configured to direct radiant energy at a different portion of the substrate 102. Although the first groove 206a and the second groove 206b form a first ring, the first groove 206a and the second groove 206b have different cross sectional shapes to enable lamps disposed within each of the first groove 206a and the second groove 206b to be oriented towards a different radial position on the substrate 102. The wall 216 of each of the grooves 206a-206h is what forms the cross sectional shape of the grooves 206a-206h. The walls 216 of each one of the grooves 206a-206h form a cross sectional shape of at least a portion of an ellipse, a circle, an oval, a parabola, an oval, a hyperbola, or other suitable curved shape.

The wall 216 of the first groove 206a have a different cross sectional shape than the wall 216 of the second groove 206b, such that the first groove 206a and the second groove 206b direct radiant energy in directions which are different and/or not mirror images of one another. The wall 216 of the third groove 206c have a different cross sectional shape than the wall 216 of the fourth groove 206d. The wall 216 of the fifth groove 206e have a different cross sectional shape than the wall 216 of the sixth groove 206f. The wall 216 of the seventh groove 206g have a different cross sectional shape than the wall 216 of the eighth groove 206h.

The cross section of the first groove 206a causes light to be focused in a first direction, the first direction having a first angle $\theta_1$ with respect to a vertical plane and the vertical plane being parallel to the axis A. The cross section of the second groove 206b causes light to be focused in a second direction, the second direction having a second angle $\theta_2$ with respect to the vertical plane. The cross section of the third groove 206c causes light to be focused in a third direction, the third direction having a third angle $\theta_3$ with respect to the vertical plane. The cross section of the fourth groove 206d causes light to be focused in a fourth direction, the fourth direction having a fourth angle $\theta_4$ with respect to the vertical plane. The cross section of the fifth groove 206e causes light to be focused in a fifth direction, the fifth direction having a fifth angle $\theta_5$ with respect to the vertical plane. The cross section of the sixth groove 206f causes light to be focused in a sixth direction, the sixth direction having a sixth angle $\theta_6$ with respect to the vertical plane. The cross section of the seventh groove 206g causes light to be focused in a seventh direction, the seventh direction having a seventh angle $\theta_7$ with respect to the vertical plane. The cross section of the eighth groove 206h causes light to be focused in an eighth direction, the eighth direction having an eighth angle $\theta_8$ with respect to the vertical plane.

The first angle $\theta_1$ is different from the second angle $\theta_2$. The third angle $\theta_3$ is different from the fourth angle $\theta_4$. The fifth angle $\theta_5$ is different from the sixth angle $\theta_6$. The seventh angle $\theta_7$ is different from the eighth angle $\theta_8$.

As each set of grooves 206a-206h within each ring is shaped to direct energy at a different radial location along the wafer, a high degree of thermal control is enabled. The grooves 206a-206h may be grouped, such that a controller controls some of the grooves 206a-206h simultaneously. Each of the individual grooves within the first groove 206a are controlled together. Each of the individual grooves within the second groove 206b are controlled together. Each of the individual grooves within the third groove 206c are controlled together. Each of the individual grooves within the fourth groove 206d are controlled together. Each of the individual grooves within the fifth groove 206e are controlled together. Each of the individual grooves within the sixth groove 206f are controlled together. Each of the individual grooves within the seventh groove 206g are controlled together. Each of the individual grooves within the eighth groove 206h are controlled together.

Figure 3A:
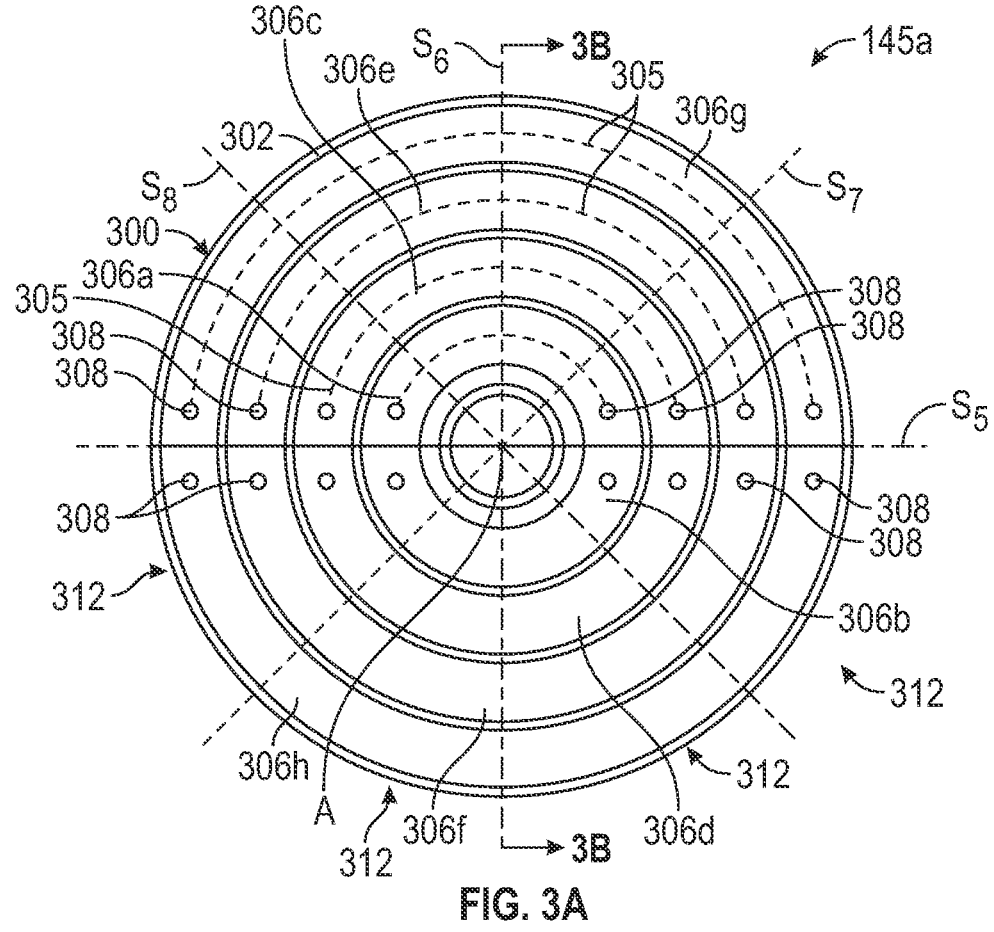
FIG. 3A illustrates a plan view of a first embodiment of a lower lamp module, according to embodiments of the present disclosure.

FIG. 3A illustrates a plan view of a first embodiment of a lower lamp module 145a. The lower lamp module 145a includes a reflector body 300 and a plurality of lower lamps 143 (FIG. 1). The reflector body 300 includes a plurality of grooves formed in the top surface 302. The top surface 302 may be described as a first surface of the reflector body 300. A bottom surface 303 (FIG. 3B) is disposed opposite the top surface 302 and may be described as a second surface. The bottom surface 303 is parallel to the top surface 302. The top surface 302 includes a plurality of grooves 306a-306h.

Each of the plurality of grooves 306a-306h are configured to hold a horizontal lamp extending along the direction of each of the grooves 306a-306h. The walls 316 of each of the plurality of grooves 306a-306h have a generally elliptical, round, parabolic, or ovoid cross section and are configured to direct energy emitted by a lamp towards a substrate within the deposition chamber 100.

In some embodiments, the reflector body 300 is formed of a reflective material, such as aluminum or steel. In some embodiments, the reflector body 300 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 300 is formed of the second material. The top surface 302 may have a reflectance of greater than about 90%, such as greater than about 98% for wavelengths between about 700 nm to about 15000 nm, such as about 700 nm to about 1000 nm or about 1000 nm to about 15000 nm. The top surface 302 is made from or coated with the second material.

The plurality of grooves 306a-306h are arranged to form portions of concentric rings along the top surface 302. In the embodiment of FIG. 2A, a first groove 306a and a second groove 306b form a first ring. A third groove 306c and a fourth groove 306d form a second ring. A fifth groove 306e and a sixth groove 306f form a third ring. A seventh groove 306g and an eighth groove 306h form a fourth ring. The second ring circumscribes the first ring and is concentric with the first ring. The third ring circumscribes the second ring and is concentric with the second ring. The fourth ring circumscribes the third ring and is concentric with the third ring. As shown herein, each of the plurality of grooves 306a-306h forms a semicircle, such that the first groove 306a forms a first semicircle, the second groove 306b forms a second semicircle, the third groove 306c forms a third semicircle, the fourth groove 306d forms a fourth semicircle, and so on. In alternative embodiments, each of the plurality of grooves 306a-306h do not form full semicircles, and instead form less than 50% of a circle, such as an arc extending less than 180 degrees around a central axis. Each of the plurality of grooves 306a-306h may also form less than 40% of a circle, such as an arc extending less than about 145 degrees around a central axis. Each of the plurality of grooves 306a-306h may also form about 30% to about 35% of a circle, such as an arc extending about 105 degrees to about 130 degrees around a central axis. Each of the plurality of grooves 306a-306h may also form less than about 30% of a circle, such as an arc extending less than 105 degrees around a central axis. Each of the plurality of grooves 306a-306h may also form about 20% to about 29% of a circle, such as an arc extending about 70 degrees to about 100 degrees around a central axis. Each of the plurality of grooves 306a-306h are curved grooves and extend along a curved length.

Each of the grooves 306a-306h has at least one hole 308 formed therethrough. Each hole 308 extends from a top of one of the grooves 306a-306h to the bottom surface 303 and enables an electrical connection of a lamp to be disposed therethrough. As shown herein, each of the grooves 306a-306h includes at least two holes 308, such as two holes 308. Each of the holes 308 are located proximate to the distal ends of the grooves 306a-306h, such that one hole 308 is located at one distal end of one of the grooves 306a-306h and a second hole 308 is located at the opposite distal end of the same groove 306a-306h. In addition to providing electrical support, the holes 308 may serve to allow for mechanical support of the lamps disposed within each of the grooves 306a-306h. Each of the lamps within the grooves 306a-306h includes a filament 305 (four are shown, in phantom, for clarity). The filament 305 is shown in some of the grooves 306a-306h herein and illustrates the location of a linear lamp filament relative to each of the grooves 306a-306h. The filament 305 is disposed between two holes 308 formed in the grooves 306a-306h.

The grooves 306a-306h are split into at least two portions. As shown in FIG. 2A, the grooves 306a-306h are split into two halves across a first section plane $S_5$. The first half is formed by the first groove 306a, the third groove 306c, the fifth groove 306e, and the seventh groove 306g. The second half is formed by the second groove 306b, the fourth groove 306d, the sixth groove 306f, and the eighth groove 306h.

An opening 310 is formed through the reflector body 300. The opening 310 is a passage extending from the top surface 302 to the bottom surface 303 of the reflector body 300. The opening 310 allows the shaft 118 of the substrate support 106 to pass therethrough. The opening is disposed inside of the first ring of grooves, such as between the first groove 306a and the second groove 306b. The opening 310 is disposed through the center of the reflector body 300 and around the axis A.

Additional section planes $S_6$, $S_7$, and $S_8$ are disposed through the reflector body 300. The additional section planes $S_6$, $S_7$, and $S_8$ are shown to illustrate additional locations where the grooves 306a-306h can be split to form smaller grooves. The second section plane $S_6$ is disposed at about a 90 degree angle from the first section plane $S_1$. The third section plane $S_7$ is disposed at an angle between about −30 degrees and about −70 degrees from the first section plane $S_5$. The fourth section plane $S_8$ is disposed at an angle between about 30 degrees and about 70 degrees from the first section plane $S_5$. If the grooves 306a-306h are split across the third section plane $S_7$ in addition to across the first section plane $S_5$, the grooves 306a-306h form quarter circles, or curves smaller than quarter circles. The grooves 306a-306h may further be split across the second section plane $S_6$ and the fourth section plane $S_8$. The grooves 306a-306h may therefore be split to form less than 13% of a circle, such as $\frac{1}{8}^{th}$ circles. The section planes $S_5$, $S_6$, $S_7$, and $S_8$ therefore split the reflector body 300 into sections 312, wherein each section 312 is a sector or pie-shape.

In some embodiments, each of the grooves 306a-306h comprises further subsection grooves, such that each of the one or more grooves 306a-306h includes multiple subsections, such as one groove subsection, two groove subsections, three groove subsections, four groove subsections, or five groove subsections. The number of separate grooves or groove subsections comprising each of the first groove 306a, the second groove 306b, the third groove 306c, the fourth groove 306d, the fifth groove 306e, the sixth groove 306f, the seventh groove 306g, or the eighth groove 306h varies depending on the desired radiation distribution on the substrate. In some embodiments, the individual grooves forming the grooves 306a-306h are connected to form a single groove, but the cross section of the groove changes at a section line, such as one of the fifth section plane $S_5$, the sixth section plane $S_6$, the seventh section plane $S_7$, or the eighth section plane $S_8$. In this embodiment, the multiple individual grooves forming the grooves 306a-306h are still referenced as individual grooves but are actually a single continuous groove with a changing cross section.

Figure 3B:
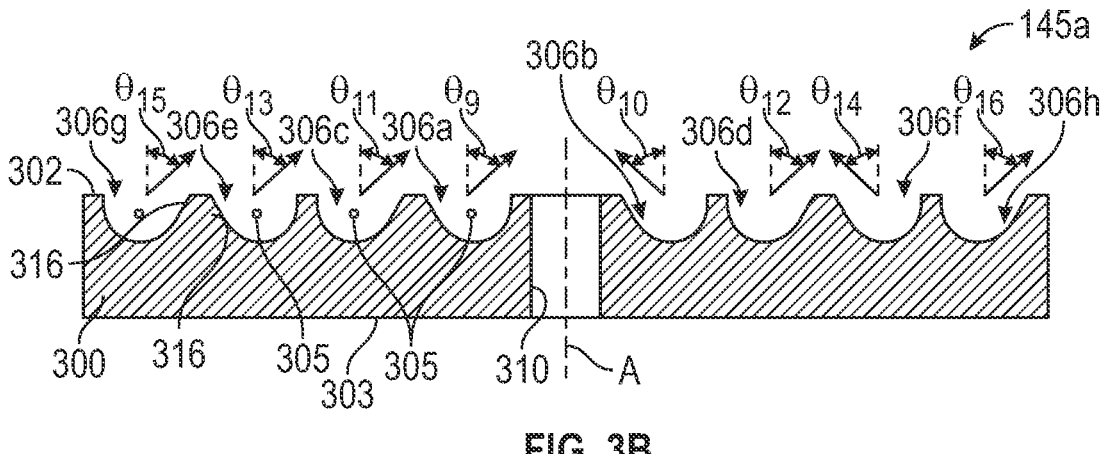
FIG. 3B illustrates a cross-sectional view of the first embodiment of the lower lamp module, according to embodiments of the present disclosure.

FIG. 3B illustrates a cross-sectional view of the first embodiment of the lower lamp module 145a. The cross-section is taken along the plane 3B-3B and splits the reflector body 300 in half. Each of the grooves 306a-306h are centered around the axis A. Each of the grooves 306a-306h are configured to direct radiant energy at a different portion of the substrate 102 or the substrate support 106. Although the first groove 306a and the second groove 306b form a first ring, the first groove 306a and the second groove 306b have different cross sectional shapes to enable lamps disposed within each of the first groove 306a and the second groove 306b to be oriented towards a different radial position on the substrate 102. The wall 316 of each of the grooves 306a-306h is what forms the cross sectional shape of the grooves 306a-306h. The walls 316 of each one of the grooves 306a-306h form a cross sectional shape of at least a portion of an ellipse, a circle, an oval, a parabola, an oval, a hyperbola, or other suitable curved shape.

The wall 316 of the first groove 306a have a different cross sectional shape than the wall 316 of the second groove 306b. The wall 316 of the third groove 306c have a different cross sectional shape than the wall 316 of the fourth groove 306d. The wall 316 of the fifth groove 306e have a different cross sectional shape than the wall 316 of the sixth groove 306f. The wall 316 of the seventh groove 306g have a different cross sectional shape than the wall 316 of the eighth groove 306h.

The cross section of the first groove 306a causes light to be focused in a first direction, the first direction having a first angle $\theta_9$ with respect to a vertical plane and the vertical plane being parallel to the axis A. The cross section of the second groove 306b causes light to be focused in a second direction, the second direction having a second angle $\theta_{10}$ with respect to the vertical plane. The cross section of the third groove 306c causes light to be focused in a third direction, the third direction having a third angle $\theta_{11}$ with respect to the vertical plane. The cross section of the fourth groove 306d causes light to be focused in a fourth direction, the fourth direction having a fourth angle $\theta_{12}$ with respect to the vertical plane. The cross section of the fifth groove 306e causes light to be focused in a fifth direction, the fifth direction having a fifth angle $\theta_{13}$ with respect to the vertical plane. The cross section of the sixth groove 306f causes light to be focused in a sixth direction, the sixth direction having a sixth angle $\theta_{14}$ with respect to the vertical plane. The cross section of the seventh groove 306g causes light to be focused in a seventh direction, the seventh direction having a seventh angle $\theta_{15}$ with respect to the vertical plane. The cross section of the eighth groove 306h causes light to be focused in an eighth direction, the eighth direction having an eighth angle $\theta_{16}$ with respect to the vertical plane.

The first angle $\theta_9$ is different from the second angle $\theta_{10}$. The third angle $\theta_{11}$ is different from the fourth angle $\theta_{12}$. The fifth angle $\theta_{13}$ is different from the sixth angle $\theta_{14}$. The seventh angle $\theta_{15}$ is different from the eighth angle $\theta_{16}$.

As each set of grooves 306a-306h within each ring is shaped to direct energy at a different radial location along the wafer, a high degree of thermal control is enabled. The grooves 306a-306h may be grouped, such that a controller controls some of the grooves 306a-306h simultaneously. Each of the individual grooves within the first groove 306a are controlled together. Each of the individual grooves within the second groove 306b are controlled together. Each of the individual grooves within the third groove 306c are controlled together. Each of the individual grooves within the fourth groove 306d are controlled together. Each of the individual grooves within the fifth groove 306e are controlled together. Each of the individual grooves within the sixth groove 306f are controlled together. Each of the individual grooves within the seventh groove 306g are controlled together. Each of the individual grooves within the eighth groove 306h are controlled together.

Figure 4A:
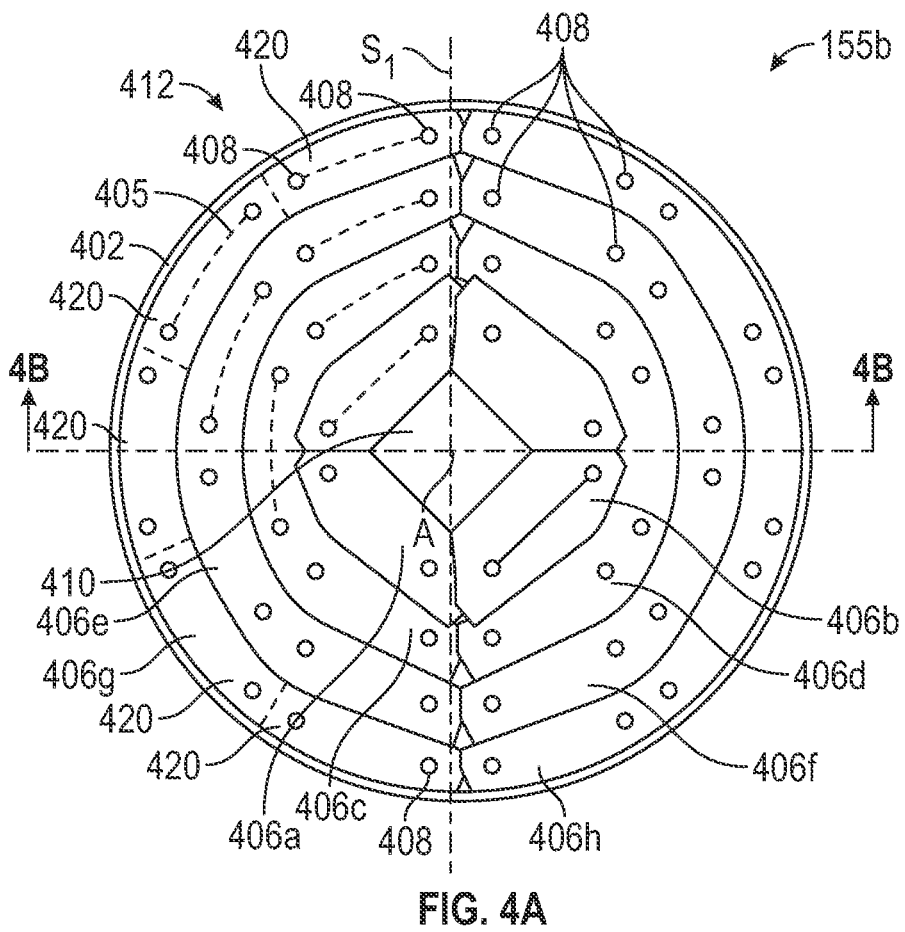
FIG. 4A illustrates a bottom plan view of a second embodiment of an upper lamp module, according to embodiments of the present disclosure.

FIG. 4A illustrates a bottom plan view of a second embodiment of an upper lamp module 155b. The upper lamp module 155b includes a reflector body 400 and a plurality of upper lamps 141 (FIG. 1). The reflector body 400 includes a plurality of grooves formed in the bottom surface 402. The bottom surface 402 may be described as a first surface of the reflector body 400. A top surface 403 (FIG. 4B) is disposed opposite the bottom surface 402 and may be described as a second surface. The top surface 403 is parallel to the bottom surface 402. The bottom surface 402 includes a plurality of grooves 406a-406h.

Each of the plurality of grooves 406a-406h are configured to hold a horizontal lamp extending along the direction of each of the grooves 406a-406h. The walls 416 of each of the plurality of grooves 406a-406h have a generally elliptical, round, parabolic, or ovoid cross section and are configured to direct energy emitted by a lamp towards a substrate support within the deposition chamber 100.

In some embodiments, the reflector body 400 is formed of a reflective material, such as aluminum or steel. In some embodiments, the reflector body 400 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 400 is formed of the second material. The bottom surface 402 may have a reflectance of greater than about 90%, such as greater than about 98% for wavelengths between about 700 nm to about 15000 nm, such as about 700 nm to about 1000 nm or about 1000 nm to about 15000 nm. The bottom surface 402 is made from or coated with the second material.

The plurality of grooves 406a-406h are arranged to form portions of concentric rings along the bottom surface 402. In the embodiment of FIG. 2A, one or more first grooves 406a and one or more second grooves 406b form a first ring. One or more third grooves 406c and one or more fourth grooves 406d form a second ring. One or more fifth grooves 406e and one or more sixth grooves 406f form a third ring. One or more seventh grooves 406g and one or more eighth grooves 406h form a fourth ring. The second ring circumscribes the first ring and is concentric with the first ring. The third ring circumscribes the second ring and is concentric with the second ring. The fourth ring circumscribes the third ring and is concentric with the third ring. As shown herein, each of the plurality of grooves 406a-406h forms a semicircle, such that the one or more first grooves 406a forms a first semicircle, the one or more second grooves 406b forms a second semicircle, the one or more third grooves 406c forms a third semicircle, the one or more fourth grooves 406d forms a fourth semicircle, and so on. In alternative embodiments, each of the plurality of grooves 406a-406h do not form full semicircles, and instead form less than 50% of a circle, such as an arc extending less than 180 degrees around a central axis. Each of the plurality of grooves 406a-406h may also form less than 40% of a circle, such as an arc extending less than about 145 degrees around a central axis. Each of the plurality of grooves 406a-406h may also form about 30% to about 35% of a circle, such as an arc extending about 105 degrees to about 130 degrees around a central axis. Each of the plurality of grooves 406a-406h may also form less than about 30% of a circle, such as an arc extending less than 105 degrees around a central axis. Each of the plurality of grooves 406a-406h may also form about 20% to about 29% of a circle, such as an arc extending about 70 degrees to about 100 degrees around a central axis.

Each of the plurality of grooves 406a-406h are formed from a plurality of individual grooves 420. Each of the individual grooves 420 is a linear groove and is configured to receive a linear lamp therein. The linear length of each of the individual grooves 420 is about 35 mm to about 175 mm, such as about 50 mm to about 150 mm. The linear length of each of the individual grooves 420 is chosen to enable uniform heating within a predetermined annulus of the substrate while also reducing the number of lamps within the upper lamp module 155b. Reducing the number of lamps within the upper lamp module 155b reduces costs, simplifies maintenance, and reduces the number of holes 408 formed through the reflector body 400.

Each of the individual grooves 420 within the plurality of grooves 406a-406h has at least one hole 408 formed therethrough. The hole 408 extends from a bottom of one of the grooves 406a-406h to the top surface 403 and enables an electrical connection of a lamp to be disposed therethrough. As shown herein, each of the individual grooves 420 of the grooves 406a-406h includes at least two holes 408, such as two holes 408. Each of the holes 408 are located proximate to the distal ends of the grooves 406a-406h, such that one hole 408 is located at one distal end of one of the individual groove 420 and a second hole 408 is located at the opposite distal end of the same individual groove 420. In addition to providing electrical support, the holes 408 may serve to allow for mechanical support of the lamps disposed within each of the grooves 406a-406h. Each of the linear lamps within the individual grooves 420 include a filament 405 (seven are shown, in phantom, for clarity). The filament 405 is shown in some of the individual grooves 420 herein and illustrates the location of a linear lamp filament relative to each of the individual grooves 420. The filament 405 is disposed between two holes 408 formed in the grooves 406a-406i.

The grooves 406a-406h are split into at least two sections. As shown in FIG. 4A, the grooves 406a-406h are split into two halves across a first section plane $S_1$. The first half is formed by the first groove 406a, the third groove 406c, the fifth groove 406e, and the seventh groove 406g. The second half is formed by the second groove 406b, the fourth groove 406d, the sixth groove 406f, and the eighth groove 406h. A planar surface 410 is disposed in the middle of the grooves 406a-406h and through the central axis A of the reflector body 400. The planar surface 410 may protrude from the bottom surface 402 or be in line with the bottom surface 402.

There may be 2-10 individual grooves 420, which form each of the first grooves 406a, the second grooves 406b, the third grooves 406c, the fourth grooves 406d, the fifth grooves 406e, the sixth grooves 406f, the seventh grooves 406g, and the eighth grooves 406h. There may be 2-5 individual grooves 420, which form each of the first grooves 406a, the second grooves 406b, the third grooves 406c, the fourth grooves 406d, the fifth grooves 406e, the sixth grooves 406f, the seventh grooves 406g, and the eighth grooves 406h. The number of individual grooves 420 comprising each of the first groove 406a, the second groove 406b, the third groove 406c, the fourth groove 406d, the fifth groove 406e, the sixth groove 406f, the seventh groove 406g, or the eighth groove 406h varies depending on the desired radiation distribution on the substrate. In some embodiments, the individual grooves forming the grooves 406a-406h are connected to form a single groove, but the cross section of the groove changes at a section line, such as the first section plane $S_1$ or another section plane (not shown). In this embodiment, the multiple individual grooves forming the grooves 406a-406h are still referenced as individual grooves, but are actually a single continuous groove with a changing cross section.

Figure 4B:
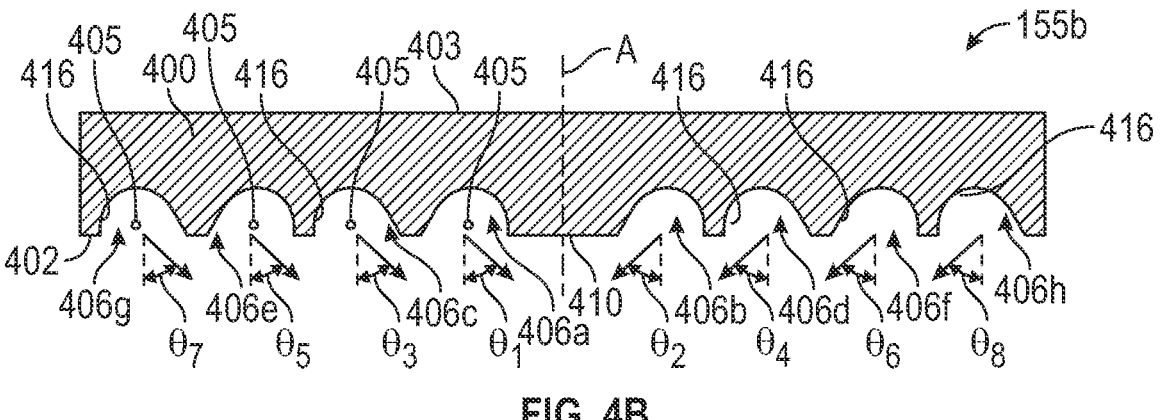
FIG. 4B illustrates a cross-sectional view of the second embodiment of the upper lamp module, according to embodiments of the present disclosure.

FIG. 4B illustrates a cross-sectional view of the second embodiment of the upper lamp module 155b. The cross-section is taken along the plane 4B-4B and splits the reflector body 400 in half. Each of the grooves 406a-406h are centered around the axis A. Each of the grooves 406a-406h are configured to direct radiant energy at a different portion of the substrate 102. Although the one or more first grooves 406a and the one or more second grooves 406b form a first ring, the one or more first grooves 406a and the one or more second grooves 406b have different cross sectional shapes to enable lamps disposed within each of the one or more first grooves 406a and the one or more second grooves 406b to be oriented towards a different radial position on the substrate 102. The wall 416 of each of the grooves 406a-406h is what forms the cross sectional shape of the grooves 406a-406h. The walls 416 of each one of the grooves 406a-406h form a cross sectional shape of at least a portion of an ellipse, a circle, an oval, a parabola, an oval, a hyperbola, or other suitable curved shape.

The walls 416 of the one or more first groove 406a have a different cross sectional shape than the walls 416 of the one or more second groove 406b. The walls 416 of the one or more third grooves 406c have a different cross sectional shape than the walls 416 of the fourth groove 406d. The walls 416 of the one or more fifth grooves 406e have a different cross sectional shape than the walls 416 of the one or more sixth grooves 406f. The wall 416 of the one or more seventh grooves 406g have a different cross sectional shape than the walls 416 of the one or more eighth grooves 406h.

The cross section of the one or more first grooves 406a causes light to be focused in a first direction, the first direction having a first angle $\theta_1$ with respect to a vertical plane and the vertical plane being parallel to the axis A. The cross section of the one or more second grooves 406b causes light to be focused in a second direction, the second direction having a second angle $\theta_2$ with respect to the vertical plane. The cross section of the one or more third grooves 406c causes light to be focused in a third direction, the third direction having a third angle $\theta_3$ with respect to the vertical plane. The cross section of the one or more fourth grooves 406d causes light to be focused in a fourth direction, the fourth direction having a fourth angle $\theta_4$ with respect to the vertical plane. The cross section of the one or more fifth grooves 406e causes light to be focused in a fifth direction, the fifth direction having a fifth angle $\theta_5$ with respect to the vertical plane. The cross section of the one or more sixth grooves 406f causes light to be focused in a sixth direction, the sixth direction having a sixth angle $\theta_6$ with respect to the vertical plane. The cross section of the one or more seventh grooves 406g causes light to be focused in a seventh direction, the seventh direction having a seventh angle 87 with respect to the vertical plane. The cross section of the one or more eighth grooves 406h causes light to be focused in an eighth direction, the eighth direction having an eighth angle $\theta_8$ with respect to the vertical plane.

The first angle $\theta_1$ is different from the second angle $\theta_2$. The third angle 83 is different from the fourth angle $\theta_4$. The fifth angle $\theta_5$ is different from the sixth angle $\theta_6$. The seventh angle $\theta_7$ is different from the eighth angle $\theta_8$. In some embodiments, individual grooves within the plurality of grooves 406a-406h are capable of being oriented in a different direction and have a different cross sectional shape than adjacent grooves within the same groove 406a-406h.

As each set of grooves 406a-406h within each ring is shaped to direct energy at a different radial location along the wafer, a high degree of thermal control is enabled. The grooves 406a-406h may be grouped, such that a controller controls some of the grooves 406a-406h simultaneously. Each of the individual grooves 420 within the first grooves 406a are controlled together. Each of the individual grooves 420 within the second grooves 406b are controlled together. Each of the individual grooves 420 within the third grooves 406c are controlled together. Each of the individual grooves 420 within the fourth grooves 406d are controlled together. Each of the individual grooves 420 within the fifth grooves 406e are controlled together. Each of the individual grooves 420 within the sixth grooves 406f are controlled together. Each of the individual grooves 420 within the seventh grooves 406g are controlled together. Each of the individual grooves 420 within the eighth grooves 406h are controlled together.

Figure 5A:
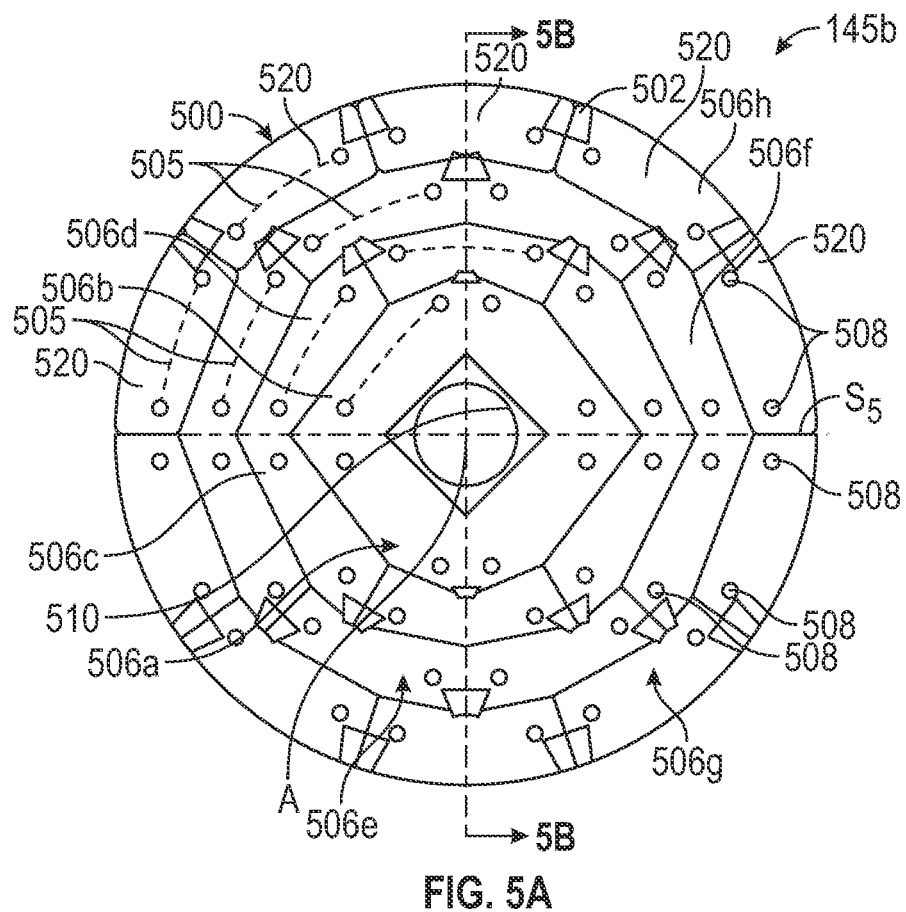
FIG. 5A illustrates a plan view of a second embodiment of a lower lamp module, according to embodiments of the present disclosure.

FIG. 5A illustrates a plan view of a second embodiment of a lower lamp module 145b. The lower lamp module 145b includes a reflector body 500 and a plurality of lower lamps 143 (FIG. 1). The reflector body 500 includes a plurality of grooves formed in the top surface 502. The top surface 502 may be described as a first surface of the reflector body 500. A bottom surface 503 (FIG. 5B) is disposed opposite the top surface 502 and may be described as a second surface. The bottom surface 503 is parallel to the top surface 502. The top surface 502 includes a plurality of grooves 506a-506h.

Each of the plurality of grooves 506a-506h are configured to hold a horizontal lamp extending along the direction of each of the grooves 506a-506h. The walls 516 of each of the plurality of grooves 506a-506h have a generally elliptical, round, parabolic, or ovoid cross section and are configured to direct energy emitted by a lamp towards a substrate within the deposition chamber 100.

In some embodiments, the reflector body 500 is formed of a reflective material, such as aluminum or steel. In some embodiments, the reflector body 500 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 500 is formed of the second material. The top surface 502 may have a reflectance of greater than about 90%, such as greater than about 98% for wavelengths between about 700 nm to about 15000 nm, such as about 700 nm to about 1000 nm or about 1000 nm to about 15000 nm. The top surface 502 is made from or coated with the second material.

The plurality of grooves 506a-506h are arranged to form portions of concentric rings along the top surface 502. In the embodiment of FIG. 5A, one or more first grooves 506a and one or more second grooves 506b form a first ring. One or more third grooves 506c and one or more fourth grooves 506d form a second ring. One or more fifth grooves 506e and one or more sixth grooves 506f form a third ring. One or more seventh grooves 506g and one or more eighth grooves 506h form a fourth ring. The second ring circumscribes the first ring and is concentric with the first ring. The third ring circumscribes the second ring and is concentric with the second ring. The fourth ring circumscribes the third ring and is concentric with the third ring. As shown herein, each of the plurality of grooves 506a-506h forms a semicircle, such that the one or more first grooves 506a forms a first semicircle, the one or more second grooves 506b forms a second semicircle, the one or more third grooves 506c forms a third semicircle, the one or more fourth grooves 506d forms a fourth semicircle, and so on. In alternative embodiments, each of the plurality of grooves 506a-506h do not form full semicircles, and instead form less than 50% of a circle, such as an arc extending less than 180 degrees around a central axis. Each of the plurality of grooves 506a-506h may also form less than 40% of a circle, such as an arc extending less than about 145 degrees around a central axis. Each of the plurality of grooves 506a-506h may also form about 30% to about 35% of a circle, such as an arc extending about 105 degrees to about 130 degrees around a central axis. Each of the plurality of grooves 506a-506h may also form less than about 30% of a circle, such as an arc extending less than 105 degrees around a central axis. Each of the plurality of grooves 506a-506h may also form about 20% to about 29% of a circle, such as an arc extending about 70 degrees to about 100 degrees around a central axis. Each of the plurality of grooves 506a-506h are formed from a plurality of individual grooves 520.

Each of the individual grooves 520 is a linear groove and is configured to receive a linear lamp therein. The linear length of each of the individual grooves 520 is about 35 mm to about 175 mm, such as about 50 mm to about 150 mm. The linear length of each of the individual grooves 520 is chosen to enable uniform heating within a predetermined annulus of the substrate while also reducing the number of lamps within the lower lamp module 145b. Reducing the number of lamps within the lower lamp module 145b reduces costs, simplifies maintenance, and reduces the number of holes 508 formed through the reflector body 500.

Each of the individual grooves 520 within the plurality of grooves 506a-506h has at least one hole 508 formed therethrough. The hole 508 extends from a bottom of one of the grooves 506a-506h to the bottom surface 503 and enables an electrical connection of a lamp to be disposed therethrough. As shown herein, each of the individual grooves 520 of the grooves 506a-506h includes at least two holes 508, such as two holes 508. Each of the holes 508 are located proximate to the distal ends of the grooves 506a-506h, such that one hole 508 is located at one distal end of one of the individual groove 520 and a second hole 508 is located at the opposite distal end of the same individual groove 520. In addition to providing electrical support, the holes 508 may serve to allow for mechanical support of the lamps disposed within each of the grooves 506a-506h. Each of the linear lamps within the individual grooves 520 include a filament 505 (seven are shown, in phantom, for clarity). The filament 505 is shown in some of the individual grooves 520 herein and illustrates the location of a linear lamp filament relative to each of the individual grooves 520. The filament 505 is disposed between two holes 508 formed in the grooves 506a-506i.

The grooves 506a-506h are split into at least two sections. As shown in FIG. 5A, the grooves 506a-506h are split into two halves across a first section plane $S_5$. The first half is formed by the first groove 506a, the third groove 506c, the fifth groove 506e, and the seventh groove 506g. The second half is formed by the second groove 506b, the fourth groove 506d, the sixth groove 506f, and the eighth groove 506h.

An opening 510 is disposed in the middle of the grooves 506a-506h and the reflector body 500. The opening 510 is a passage extending from the top surface 502 to the bottom surface 503 of the reflector body 500. The opening 510 allows the shaft 118 of the substrate support 106 to pass therethrough. The opening 510 is disposed inside of the first ring of grooves, such as between the first groove 506a and the second groove 506b. The opening 510 is disposed through the center of the reflector body 500 and around the axis A.

There may be 2-10 individual grooves 520, which form each of the first grooves 506a, the second grooves 506b, the third grooves 506c, the fourth grooves 506d, the fifth grooves 506e, the sixth grooves 506f, the seventh grooves 506g, and the eighth grooves 506h. There may be 2-5 individual grooves 520, which form each of the first grooves 506a, the second grooves 506b, the third grooves 506c, the fourth grooves 506d, the fifth grooves 506e, the sixth grooves 506f, the seventh grooves 506g, and the eighth grooves 506h. The number of individual grooves 520 comprising each of the first groove 506a, the second groove 506b, the third groove 506c, the fourth groove 506d, the fifth groove 506e, the sixth groove 506f, the seventh groove 506g, or the eighth groove 506h varies depending on the desired radiation distribution on the substrate. In some embodiments, the individual grooves 520 forming the grooves 506a-506h are connected to form a single groove, but the cross section of the groove changes at a section line, such as the fifth section plane $S_5$ or another section plane (not shown). In this embodiment, the multiple individual grooves 520 forming the grooves 506a-506h are still referenced as individual grooves 520, but are actually a single continuous groove with a changing cross section.

Figure 5B:
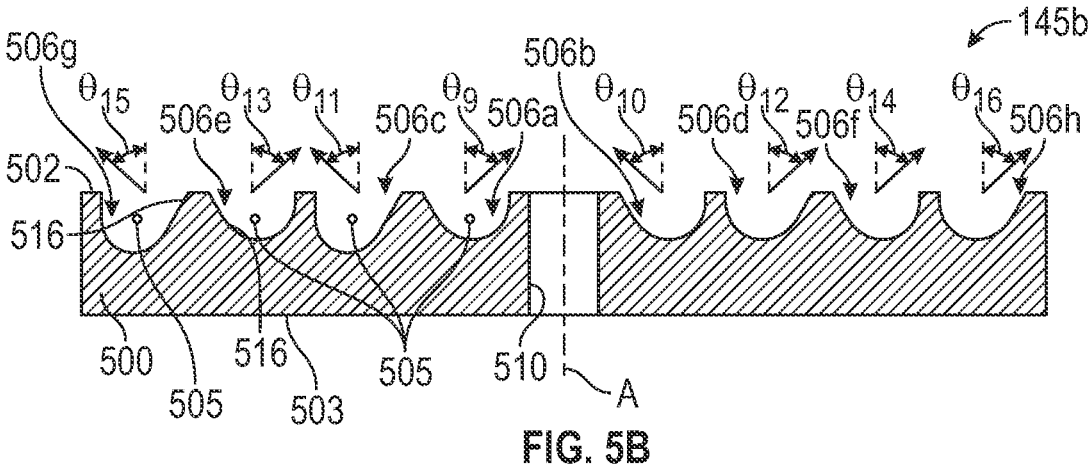
FIG. 5B illustrates a cross-sectional view of the second embodiment of the lower lamp module, according to embodiments of the present disclosure.

FIG. 5B illustrates a cross-sectional view of the second embodiment of the lower lamp module 145b. The cross-section is taken along the plane 5B-5B and splits the reflector body 500 in half. Each of the grooves 506a-506h are centered around the axis A. Each of the grooves 506a-506h are configured to direct radiant energy at a different portion of the substrate 102 or the substrate support 106. Although the one or more first grooves 506a and the one or more second grooves 506b form a first ring, the one or more first grooves 506a and the one or more second grooves 506b have different cross sectional shapes to enable lamps disposed within each of the one or more first grooves 506a and the one or more second grooves 506b to be oriented towards a different radial position on the substrate 102. The wall 516 of each of the grooves 506a-506h is what forms the cross sectional shape of the grooves 506a-506h. The walls 516 of each one of the grooves 506a-506h form a cross sectional shape of at least a portion of an ellipse, a circle, an oval, a parabola, an oval, a hyperbola, or other suitable curved shape.

The walls 516 of the one or more first groove 506a have a different cross sectional shape than the walls 516 of the one or more second groove 506b. The walls 516 of the one or more third grooves 506c have a different cross sectional shape than the walls 516 of the fourth groove 506d. The walls 516 of the one or more fifth grooves 506e have a different cross sectional shape than the walls 516 of the one or more sixth grooves 506f. The wall 516 of the one or more seventh grooves 506g have a different cross sectional shape than the walls 516 of the one or more eighth grooves 506h.

The cross section of the one or more first grooves 506a causes light to be focused in a first direction, the first direction having a first angle $\theta_9$ with respect to a vertical plane and the vertical plane being parallel to the axis A. The cross section of the one or more second grooves 506b causes light to be focused in a second direction, the second direction having a second angle $\theta_{10}$ with respect to the vertical plane. The cross section of the one or more third grooves 506c causes light to be focused in a third direction, the third direction having a third angle $\theta_{11}$ with respect to the vertical plane. The cross section of the one or more fourth grooves 506d causes light to be focused in a fourth direction, the fourth direction having a fourth angle $\theta_{12}$ with respect to the vertical plane. The cross section of the one or more fifth grooves 506e causes light to be focused in a fifth direction, the fifth direction having a fifth angle $\theta_{13}$ with respect to the vertical plane. The cross section of the one or more sixth grooves 506f causes light to be focused in a sixth direction, the sixth direction having a sixth angle $\theta_{14}$ with respect to the vertical plane. The cross section of the one or more seventh grooves 506g causes light to be focused in a seventh direction, the seventh direction having a seventh angle $\theta_{15}$ with respect to the vertical plane. The cross section of the one or more eighth grooves 506h causes light to be focused in an eighth direction, the eighth direction having an eighth angle $\theta_{16}$ with respect to the vertical plane.

The first angle $\theta_9$ is different from the second angle $\theta_{10}$. The third angle $\theta_{11}$ is different from the fourth angle $\theta_{12}$. The fifth angle $\theta_{13}$ is different from the sixth angle $\theta_{14}$. The seventh angle $\theta_{15}$ is different from the eighth angle $\theta_{16}$. In some embodiments, individual grooves within the plurality of grooves 506a-506h are capable of being oriented in a different direction and have a different cross sectional shape than adjacent grooves within the same groove 506a-506h.

As each set of grooves 506a-506h within each ring is shaped to direct energy at a different radial location along the wafer, a high degree of thermal control is enabled. The grooves 506a-506h may be grouped, such that a controller controls some of the grooves 506a-506h simultaneously. Each of the individual grooves 520 within the first grooves 506a are controlled together. Each of the individual grooves 520 within the second grooves 506b are controlled together. Each of the individual grooves 520 within the third grooves 506c are controlled together. Each of the individual grooves 520 within the fourth grooves 506d are controlled together. Each of the individual grooves 520 within the fifth grooves 506e are controlled together. Each of the individual grooves 520 within the sixth grooves 506f are controlled together. Each of the individual grooves 520 within the seventh grooves 506g are controlled together. Each of the individual grooves 520 within the eighth grooves 506h are controlled together.

Figure 6A:
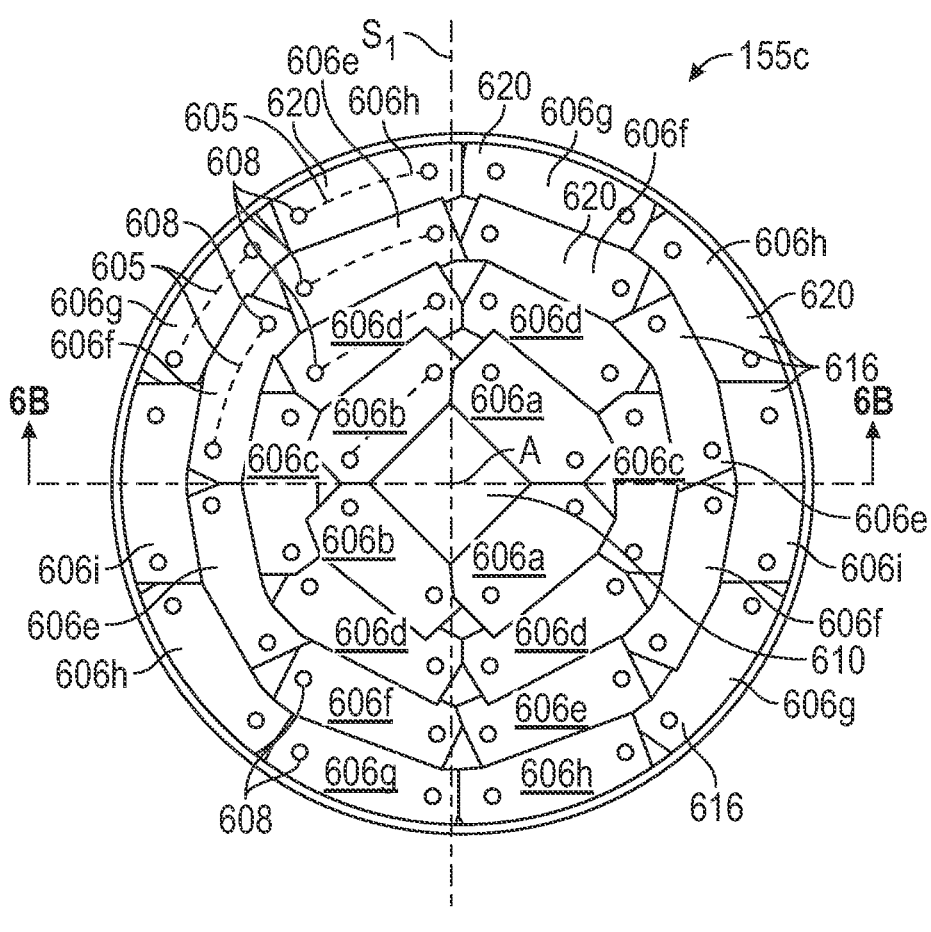
FIG. 6A illustrates a bottom plan view of a third embodiment of an upper lamp module, according to embodiments of the present disclosure.

FIG. 6A illustrates a bottom plan view of a third embodiment of an upper lamp module 155c. The upper lamp module 155c includes a reflector body 600 and a plurality of upper lamps 141 (FIG. 1). The reflector body 600 includes a plurality of grooves 606a-606i formed in the bottom surface 602. The bottom surface 602 may be described as a first surface of the reflector body 600. A top surface 603

(FIG. 6B) is disposed opposite the bottom surface 602 and may be described as a second surface. The top surface 603 is parallel to the bottom surface 602. The bottom surface 602 includes a plurality of grooves 606a-606i.

Each of the plurality of grooves 606a-606i are configured to hold a horizontal lamp extending along the direction of each of the grooves 606a-606i. The walls 616 of each of the plurality of grooves 606a-606i have a generally elliptical, round, parabolic, or ovoid cross section and are configured to direct energy emitted by a lamp towards a substrate within the deposition chamber 100.

In some embodiments, the reflector body 600 is formed of a reflective material, such as aluminum or steel. In some embodiments, the reflector body 600 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 600 is formed of the second material. The bottom surface 602 may have a reflectance of greater than about 90%, such as greater than about 98% for wavelengths between about 700 nm to about 15000 nm, such as about 700 nm to about 1000 nm or about 1000 nm to about 15000 nm. The bottom surface 602 is made from or coated with the second material.

The plurality of grooves 606a-606i are arranged to form portions of concentric rings along the bottom surface 602. A first ring is formed by a plurality of first grooves 606a and a plurality of second grooves 606b. A second ring is formed by a plurality of third grooves 606c and a plurality of fourth grooves 606d. A third ring is formed by a plurality of fifth grooves 606e and a plurality of sixth grooves 606f. A fourth ring is formed by a plurality of seventh grooves 606g, a plurality of eighth grooves 606h, and a plurality of ninth grooves 606i. Each of the plurality of grooves 606a-606i are formed from a plurality of individual grooves 620. Each of the individual grooves 620 is a linear groove and is configured to have a linear lamp disposed therein. The linear length of each of the individual grooves 620 is about 35 mm to about 175 mm, such as about 50 mm to about 150 mm. The linear length of each of the individual grooves 620 is chosen to enable uniform heating within a predetermined annulus of the substrate while also reducing the number of lamps within the upper lamp module 155c. Reducing the number of lamps within the upper lamp module 155c reduces costs, simplifies maintenance, and reduces the number of holes 608 formed through the reflector body 600.

Each of the individual grooves 620 within the plurality of grooves 606a-606i has at least one hole 608 formed therethrough. The hole 608 extends from a top of one of the grooves 606a-606i to the top surface 603 and enables an electrical connection of a lamp to be disposed therethrough. As shown herein, each of the individual grooves 620 of the grooves 606a-606i includes at least two holes 608, such as two holes 608. Each of the holes 608 are located proximate to the distal ends of the grooves 606a-606i, such that one hole 608 is located at one distal end of one of the individual groove 620 and a second hole 608 is located at the opposite distal end of the same individual groove 620. In addition to providing electrical support, the holes 608 may serve to allow for mechanical support of the lamps disposed within each of the grooves 606a-606i.

Each of the linear lamps within the individual grooves 620 include a filament 605 (six are shown, in phantom, for clarity). The filament 605 is shown in some of the individual grooves 620 herein and illustrates the location of a linear lamp filament relative to each of the individual grooves 620. The filament 605 is disposed between two holes 608 formed in the grooves 606a-606i.

A planar surface 610 is disposed in the middle of the grooves 606a-606i and through the central axis A of the reflector body 600. The planar surface 610 may protrude from the bottom surface 602 or be in line with the bottom surface 602. The planar surface 610 is disposed in the center of the grooves 606a-606i, such as between the plurality of first grooves 606a and the plurality of second grooves 606b.

There may be 2-10 individual grooves 620, which form each of the plurality of first grooves 606a, the plurality of second grooves 606b, the plurality of third grooves 606c, the plurality of fourth grooves 606d, the plurality of fifth grooves 606e, the plurality of sixth grooves 606f, the plurality of seventh grooves 606g, the plurality of eighth grooves 606h, and the plurality of ninth grooves 606i. There may be 2-5 individual grooves 620, which form each of the plurality of first grooves 606a, the plurality of second grooves 606b, the plurality of third grooves 606c, the plurality of fourth grooves 606d, the plurality of fifth grooves 606e, the plurality of sixth grooves 606f, the plurality of seventh grooves 606g, the plurality of eighth grooves 606h, and the plurality of ninth grooves 606i. The number of individual grooves 620 comprising each of the first groove 606a, the second groove 606b, the third groove 606c, the fourth groove 606d, the fifth groove 606e, the sixth groove 606f, the seventh groove 606g, the eighth groove 606h, or the ninth groove 606i varies depending on the desired radiation distribution on the substrate.

The pattern/location of each individual groove 620 of the grooves 606a-606i enables good thermal control within the deposition chamber 100. The grooves 606a-606i are distributed to be symmetrical over a plane, such as the first section plane S$_1$. The grooves 606a-606i may also be symmetrical over other planes through the reflector body 600.

The first grooves 606a and the second grooves 606b are positioned such that the first grooves 606a form a roughly semicircular shape while the second grooves 606b form a second roughly semicircular shape. The ends of the two semicircular shapes are aligned to form the first ring. Although shown as each of the first grooves 606a including two individual grooves 620 and the second grooves 606b including two individual grooves 620, other numbers of first grooves 606a and second grooves 606b are also envisioned.

In some embodiments, each of the plurality of third grooves 606c and the plurality of ninth grooves 606i are aligned along the same axis, such that a linear plane passes through each of the third grooves 606c and the ninth grooves 606i. The deposition chamber 100 may be oriented, such that the third grooves 606c and the ninth grooves 606i are aligned along a direction of gas flow through the processing volume 136.

The fourth grooves 606d are disposed between the aligned third grooves 606c, such that one or more individual grooves 620 are disposed on either side of the third grooves 606c and form the second ring. In the embodiment shown in FIG. 6A, two individual grooves 620 of the fourth grooves 606d are disposed between each of the third grooves 606c, such that there are four total fourth grooves 606d arranged in groups of two individual grooves 620.

The fifth grooves 606e and the sixth grooves 606f are alternated to form the third ring, such that between each individual groove 620 of the fifth grooves 606e, there is an individual groove 620 of the sixth grooves 606f. There are an equal number of fifth grooves 606e and sixth grooves

606f, such as four of each of the fifth grooves 606e and four of each of the sixth grooves 606f.

The seventh grooves 606g and the eighth grooves 606h are also alternated within the fourth ring. The seventh grooves 606g and the eighth grooves 606h are disposed on either side of the ninth grooves 606i. There are four seventh grooves 606g and four eighth grooves 606h.

In some embodiments, there may be other arrangements of the grooves 606a-606i, such that there are more or less sets of grooves 606a-606i or the number of individual grooves 620 within each set of grooves 606a-606i is changed.

Figure 6B:
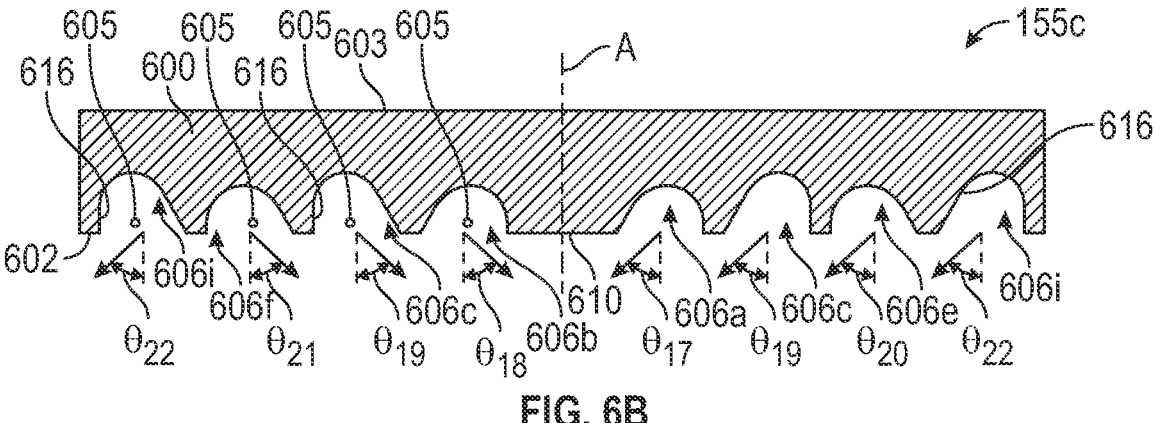
FIG. 6B illustrates a cross-sectional view of the third embodiment of the upper lamp module, according to embodiments of the present disclosure.

FIG. 6B illustrates a cross-sectional view of the third embodiment of the upper lamp module 155c. The cross-section is taken along the plane 6B-6B and splits the reflector body 600 in half. Each of the grooves 606a-606i are centered around the axis A. Each of the grooves 606a-606i are configured to direct radiant energy at a different portion of the substrate 102. Although the one or more first grooves 606a and the one or more second grooves 606b form a first ring, the one or more first grooves 606a and the one or more second grooves 606b have different cross sectional shapes to enable lamps disposed within each of the one or more first grooves 606a and the one or more second grooves 606b to be oriented towards a different radial position on the substrate 102. The wall 616 of each of the grooves 606a-606i is what forms the cross sectional shape of the grooves 606a-606i. The walls 616 of each one of the grooves 606a-606i form a cross sectional shape of at least a portion of an ellipse, a circle, an oval, a parabola, an oval, a hyperbola, or other suitable curved shape.

The walls 616 of the one or more first groove 606a have a different cross sectional shape than the walls 616 of the one or more second groove 606b. The walls 616 of the one or more third grooves 606c have a different cross sectional shape than the walls 616 of the fourth groove 606d. The walls 616 of the one or more fifth grooves 606e have a different cross sectional shape than the walls 616 of the one or more sixth grooves 606f. The wall 616 of the one or more seventh grooves 606g have a different cross sectional shape than the walls 616 of the one or more eighth grooves 606h. Similarly, the walls 616 of the one or more ninth grooves 606i have a different cross sectional shape than either of the walls 616 of the seventh grooves 606g or the eighth grooves 606h.

The cross section of the one or more first grooves 606a causes light to be focused in a first direction, the first direction having a first angle $\theta_{17}$ with respect to a vertical plane and the vertical plane being parallel to the axis A. The cross section of the one or more second grooves 606b causes light to be focused in a second direction, the second direction having a second angle $\theta_{18}$ with respect to the vertical plane. The cross section of the one or more third grooves 606c causes light to be focused in a third direction, the third direction having a third angle $\theta_{19}$ with respect to the vertical plane. The cross section of the one or more fourth grooves 606d causes light to be focused in a fourth direction, the fourth direction having a fourth angle (not shown) with respect to the vertical plane. The cross section of the one or more fifth grooves 606e causes light to be focused in a fifth direction, the fifth direction having a fifth angle $\theta_{20}$ with respect to the vertical plane. The cross section of the one or more sixth grooves 606f causes light to be focused in a sixth direction, the sixth direction having a sixth angle $\theta_{21}$ with respect to the vertical plane. The cross section of the one or more seventh grooves 606g causes light to be focused in a seventh direction, the seventh direction having a seventh angle (not shown) with respect to the vertical plane. The cross section of the one or more eighth grooves 606h causes light to be focused in an eighth direction, the eighth direction having an eighth angle (not shown) with respect to the vertical plane. The cross section of the one or more ninth grooves 606i causes light to be focused in a ninth direction, the ninth direction having a ninth angle $\theta_{22}$ with respect to the vertical plane.

The first angle $\theta_{17}$ is different from the second angle $\theta_{18}$. The third angle 819 is different from the fourth angle (not shown). The fifth angle $\theta_{20}$ is different from the sixth angle $\theta_{21}$. The seventh angle (not shown) is different from the eighth angle (not shown) and the ninth angle $\theta_{22}$. In some embodiments, individual grooves within the plurality of grooves 606a-606i are oriented in different directions and have a different cross sectional shape than adjacent grooves 606a-606i.

As each set of grooves 606a-606i within each ring is shaped to direct energy at a different radial location along the wafer, a high degree of thermal control is enabled. The grooves 606a-606i may be grouped, such that a controller controls some of the grooves 606a-606i simultaneously. Each of the individual grooves 620 within the first grooves 606a are controlled together. Each of the individual grooves 620 within the second grooves 606b are controlled together. Each of the individual grooves 620 within the third grooves 606c are controlled together. Each of the individual grooves 620 within the fourth grooves 606d are controlled together. Each of the individual grooves 620 within the fifth grooves 606e are controlled together. Each of the individual grooves 620 within the sixth grooves 606f are controlled together. Each of the individual grooves 620 within the seventh grooves 606g are controlled together. Each of the individual grooves 620 within the eighth grooves 606h are controlled together. Each of the individual grooves 620 within the ninth grooves 606i are controlled together. The third grooves 606c and the ninth grooves 606i are controlled together and shaped to direct radiant energy at a similar radial position on the substrate 102.

Figure 7A:
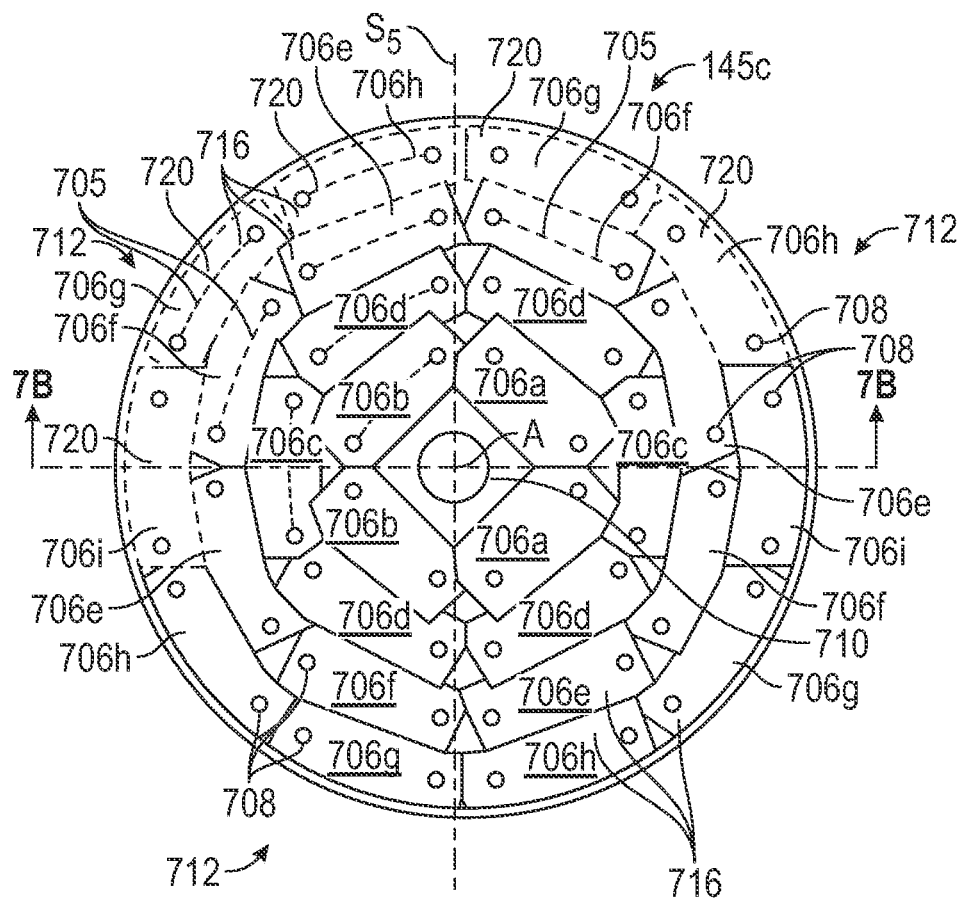
FIG. 7A illustrates a plan view of a third embodiment of a lower lamp module, according to embodiments of the present disclosure.

FIG. 7A illustrates a plan view of a third embodiment of a lower lamp module 145c. The lower lamp module 145c includes a reflector body 700 and a plurality of lower lamps 143 (FIG. 1). The reflector body 700 includes a plurality of grooves 706a-706i formed in the top surface 702. The top surface 702 may be described as a first surface of the reflector body 700. A bottom surface 703 (FIG. 7B) is disposed opposite the top surface 702 and may be described as a second surface. The bottom surface 703 is parallel to the top surface 702. The top surface 702 includes a plurality of grooves 706a-706i.

Each of the plurality of grooves 706a-706i are configured to hold a horizontal lamp extending along the direction of each of the grooves 706a-706i. The walls 716 of each of the plurality of grooves 706a-706i have a generally elliptical, round, parabolic, or ovoid cross section and are configured to direct energy emitted by a lamp towards a substrate within the deposition chamber 100.

In some embodiments, the reflector body 700 is formed of a reflective material, such as aluminum or steel. In some embodiments, the reflector body 700 is formed from a first material, such as aluminum or steel, and plated in a second material. The second material may be any one of copper, nickel, brass, bronze, silver, gold, aluminum, or an alloy thereof. The second material may be polished to increase the reflectivity. In some embodiments, the entire reflector body 700 is formed of the second material. The top surface 702 may have a reflectance of greater than about 90%, such as greater than about 98% for wavelengths between about 700 nm to about 15000 nm, such as about 700 nm to about 1000 nm or about 1000 nm to about 15000 nm. The top surface 702 is made from or coated with the second material.

The plurality of grooves 706a-706i are arranged to form portions of concentric rings along the top surface 702. A first ring is formed by a plurality of first grooves 706a and a plurality of second grooves 706b. A second ring is formed by a plurality of third grooves 706c and a plurality of fourth grooves 706d. A third ring is formed by a plurality of fifth grooves 706e and a plurality of sixth grooves 706f. A fourth ring is formed by a plurality of seventh grooves 706g, a plurality of eighth grooves 706h, and a plurality of ninth grooves 706i. Each of the plurality of grooves 706a-706i are formed from a plurality of individual grooves 720. Each of the individual grooves 720 is a linear groove and is configured to have a linear lamp disposed therein. The linear length of each of the individual grooves 720 is about 35 mm to about 175 mm, such as about 50 mm to about 150 mm. The linear length of each of the individual grooves 720 is chosen to enable uniform heating within a predetermined annulus of the substrate while also reducing the number of lamps within the lower lamp module 145c. Reducing the number of lamps within the lower lamp module 145c reduces costs, simplifies maintenance, and reduces the number of holes 708 formed through the reflector body 700.

Each of the individual grooves 720 within the plurality of grooves 706a-706i has at least one hole 708 formed therethrough. The hole 708 extends from a top of one of the grooves 706a-706i to the bottom surface 703 and enables an electrical connection of a lamp to be disposed therethrough. As shown herein, each of the individual grooves 720 of the grooves 706a-706i includes at least two holes 708, such as two holes 708. Each of the holes 708 are located proximate to the distal ends of the individual grooves 720 of the grooves 706a-706i, such that one hole 708 is located at one distal end of one of the individual groove 720 and a second hole 708 is located at the opposite distal end of the same individual groove 720. In addition to providing electrical support, the holes 708 may serve to allow for mechanical support of the lamps disposed within each of the grooves 706a-706i.

Each of the linear lamps within the individual grooves 720 include a filament 705 (eight are shown, in phantom, for clarity). The filament 705 is shown in some of the individual grooves 720 herein and illustrates the location of a linear lamp filament relative to each of the individual grooves 720. The filament 705 is disposed between two holes 708 formed in the grooves 706a-706i.

An opening 710 is disposed in the middle of the grooves 706a-706i and the reflector body 700. The opening 710 is a passage extending from the top surface 702 to the bottom surface 703 of the reflector body 700. The opening 710 allows the shaft 118 of the substrate support 106 to pass therethrough. The opening 710 is disposed inside of the first ring of grooves, such as between the first grooves 706a and the second grooves 706b. The opening 710 is disposed through the center of the reflector body 700 and around the axis A.

There may be 2-10 individual grooves 720, which form each of the plurality of first grooves 706a, the plurality of second grooves 706b, the plurality of third grooves 706c, the plurality of fourth grooves 706d, the plurality of fifth grooves 706e, the plurality of sixth grooves 706f, the plurality of seventh grooves 706g, the plurality of eighth grooves 706h, and the plurality of ninth grooves 706i. There may be 2-5 individual grooves 720, which form each of the plurality of first grooves 706a, the plurality of second grooves 706b, the plurality of third grooves 706c, the plurality of fourth grooves 706d, the plurality of fifth grooves 706e, the plurality of sixth grooves 706f, the plurality of seventh grooves 706g, the plurality of eighth grooves 706h, and the plurality of ninth grooves 706i. The number of individual grooves 720 comprising each of the first groove 706a, the second groove 706b, the third groove 706c, the fourth groove 706d, the fifth groove 706e, the sixth groove 706f, the seventh groove 706g, the eighth groove 706h, or the ninth groove 706i varies depending on the desired radiation distribution on the substrate.

The pattern/location of each individual groove 720 of the grooves 706a-706i enables good thermal control within the deposition chamber 100. The grooves 706a-706i are distributed to be symmetrical over a plane, such as the first section plane $S_5$. The grooves 706a-706i may also be symmetrical over other planes through the reflector body 700.

The first grooves 706a and the second grooves 706b are positioned such that the first grooves 706a form a roughly semicircular shape while the second grooves 706b form a second roughly semicircular shape. The ends of the two semicircular shapes are aligned to form the first ring. Although shown as each of the first grooves 706a including two individual grooves 720 and the second grooves 706b including two individual grooves 720, other numbers of first grooves 706a and second grooves 706b are also envisioned.

In some embodiments, each of the plurality of third grooves 706c and the plurality of ninth grooves 706i are aligned along the same axis, such that a linear plane passes through each of the third grooves 706c and the ninth grooves 706i. The deposition chamber 100 may be oriented, such that the third grooves 706c and the ninth grooves 706i are aligned along a direction of gas flow through the processing volume 136.

The fourth grooves 706d are disposed between the aligned third grooves 706c, such that one or more individual grooves 720 are disposed on either side of the third grooves 706c and form the second ring. In the embodiment shown in FIG. 7A, two individual grooves 720 of the fourth grooves 706d are disposed between each of the third grooves 706c, such that there are four total fourth grooves 706d arranged in groups of two individual grooves 720.

The fifth grooves 706e and the sixth grooves 706f are alternated to form the third ring, such that between each individual groove 720 of the fifth grooves 706e, there is an individual groove 720 of the sixth grooves 706f. There are an equal number of fifth grooves 706e and sixth grooves 706f, such as four of each of the fifth grooves 706e and four of each of the sixth grooves 706f.

The seventh grooves 706g and the eighth grooves 706h are also alternated within the fourth ring. The seventh grooves 706g and the eighth grooves 706h are disposed on either side of the ninth grooves 706i. There are four seventh grooves 706g and four eighth grooves 706h.

In some embodiments, there may be other arrangements of the grooves 706a-706i, such that there are more or less sets of grooves 706a-706i or the number of individual grooves 720 within each set of grooves 706a-706i is changed.

Figure 7B:
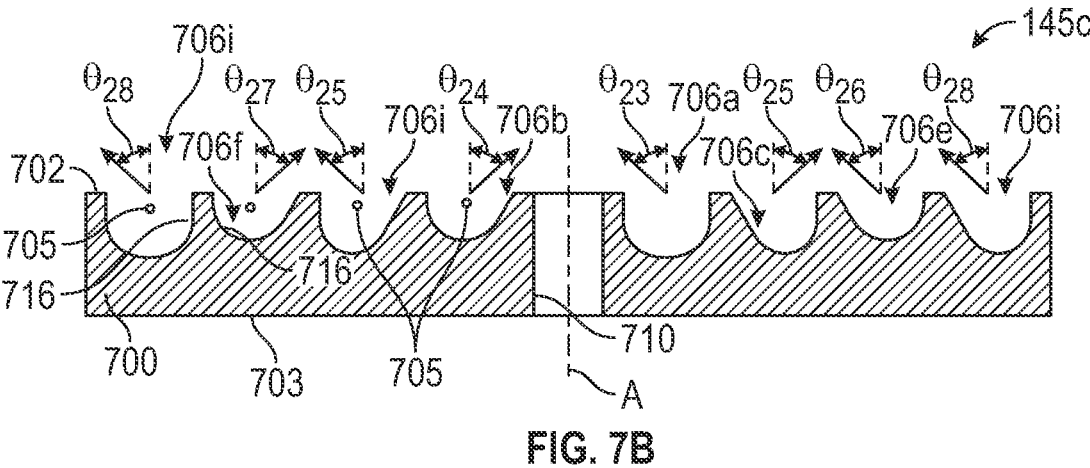
FIG. 7B illustrates a cross-sectional view of the third embodiment of the lower lamp module, according to embodiments of the present disclosure.

FIG. 7B illustrates a cross-sectional view of the third embodiment of the lower lamp module 145c. The cross-section is taken along the plane 7B-7B and splits the reflector body 700 in half. Each of the grooves 706a-706i are centered around the axis A. Each of the grooves 706a-706i are configured to direct radiant energy at a different portion of the substrate 102. Although the one or more first grooves 706a and the one or more second grooves 706b form a first ring, the one or more first grooves 706a and the one or more second grooves 706b have different cross sectional shapes to enable lamps disposed within each of the one or more first grooves 706a and the one or more second grooves 706b to be oriented towards a different radial position on the substrate 102. The wall 716 of each of the grooves 706a-706i is what forms the cross sectional shape of the grooves 706a-706i. The walls 716 of each one of the grooves 706a-706i form a cross sectional shape of at least a portion of an ellipse, a circle, an oval, a parabola, an oval, a hyperbola, or other suitable curved shape.

The walls 716 of the one or more first groove 706a have a different cross sectional shape than the walls 716 of the one or more second groove 706b. The walls 716 of the one or more third grooves 706c have a different cross sectional shape than the walls 716 of the fourth groove 706d. The walls 716 of the one or more fifth grooves 706e have a different cross sectional shape than the walls 716 of the one or more sixth grooves 706f. The wall 716 of the one or more seventh grooves 706g have a different cross sectional shape than the walls 716 of the one or more eighth grooves 706h. Similarly, the walls 716 of the one or more ninth grooves 706i have a different cross sectional shape than either of the walls 716 of the seventh grooves 706g or the eighth grooves 706h.

The cross section of the one or more first grooves 706a causes light to be focused in a first direction, the first direction having a first angle $\theta_{23}$ with respect to a vertical plane and the vertical plane being parallel to the axis A. The cross section of the one or more second grooves 706b causes light to be focused in a second direction, the second direction having a second angle $\theta_{24}$ with respect to the vertical plane. The cross section of the one or more third grooves 706c causes light to be focused in a third direction, the third direction having a third angle $\theta_{25}$ with respect to the vertical plane. The cross section of the one or more fourth grooves 706d causes light to be focused in a fourth direction, the fourth direction having a fourth angle (not shown) with respect to the vertical plane. The cross section of the one or more fifth grooves 706e causes light to be focused in a fifth direction, the fifth direction having a fifth angle $\theta_{26}$ with respect to the vertical plane. The cross section of the one or more sixth grooves 706f causes light to be focused in a sixth direction, the sixth direction having a sixth angle $\theta_{27}$ with respect to the vertical plane. The cross section of the one or more seventh grooves 706g causes light to be focused in a seventh direction, the seventh direction having a seventh angle (not shown) with respect to the vertical plane. The cross section of the one or more eighth grooves 706h causes light to be focused in an eighth direction, the eighth direction having an eighth angle (not shown) with respect to the vertical plane. The cross section of the one or more ninth grooves 706i causes light to be focused in a ninth direction, the ninth direction having a ninth angle $\theta_{28}$ with respect to the vertical plane.

The first angle $\theta_{23}$ is different from the second angle $\theta_{24}$. The third angle 825 is different from the fourth angle (not shown). The fifth angle $\theta_{26}$ is different from the sixth angle $\theta_{27}$. The seventh angle (not shown) is different from the eighth angle (not shown) and the ninth angle $\theta_{28}$. In some embodiments, individual grooves within the plurality of grooves 706a-706i are oriented in different directions and have a different cross sectional shape than adjacent grooves 706a-706i.

As each set of grooves 706a-706i within each ring is shaped to direct energy at a different radial location along the wafer, a high degree of thermal control is enabled. The grooves 706a-706i may be grouped, such that a controller controls some of the grooves 706a-706i simultaneously. Each of the individual grooves 720 within the first grooves 706a are controlled together. Each of the individual grooves 720 within the second grooves 706b are controlled together. Each of the individual grooves 720 within the third grooves 706c are controlled together. Each of the individual grooves 720 within the fourth grooves 706d are controlled together. Each of the individual grooves 720 within the fifth grooves 706e are controlled together. Each of the individual grooves 720 within the sixth grooves 706f are controlled together. Each of the individual grooves 720 within the seventh grooves 706g are controlled together. Each of the individual grooves 720 within the eighth grooves 706h are controlled together. Each of the individual grooves 720 within the ninth grooves 706i are controlled together. The third grooves 706c and the ninth grooves 706i are controlled together and shaped to direct radiant energy at a similar radial position on the substrate 102.

Although each of the upper lamp modules 155a-c and the lower lamp modules 145a-c described herein have four rings of grooves, other numbers of rings are also envisioned. In some embodiments, only three rings are utilized, five rings are utilized, or six rings are utilized. Additionally, the radial location of each of the rings can be adjusted to provide good thermal distribution on the substrate.

Figures 8A, 8B:
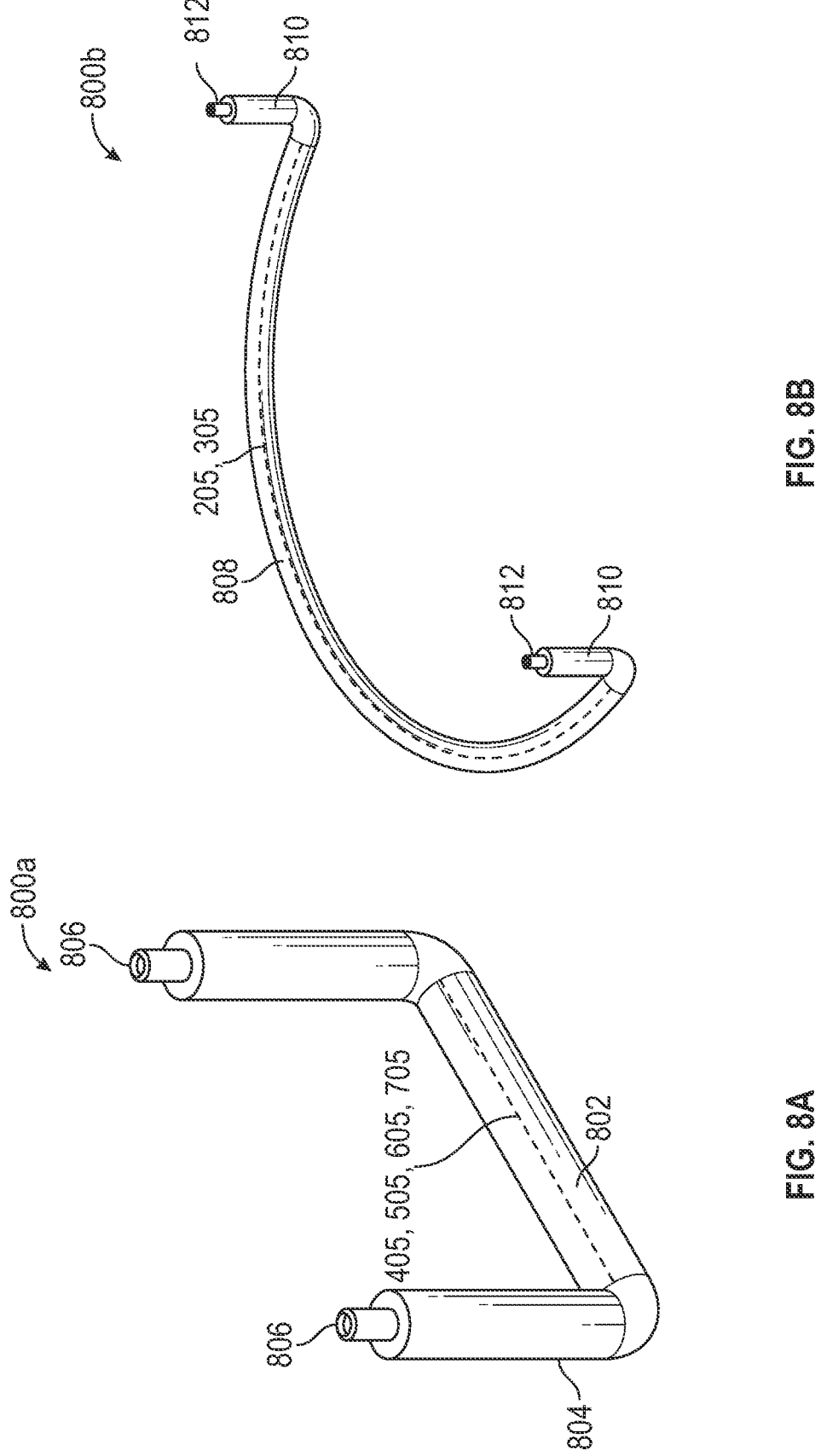
FIG. 8A illustrates a linear lamp for use within the deposition chamber of FIG. 1, according to embodiments of the present disclosure.
FIG. 8B illustrates a curved lamp for use within the deposition chamber of FIG. 1, according to embodiments of the present disclosure.

FIG. 8A illustrates a linear lamp 800a for use within the deposition chamber 100 of FIG. 1. The linear lamp 800a may be used in any of the embodiments of FIGS. 4A-7B. The linear lamp 800a includes a linear bulb 802, one or more arms 804, and one or more electrical connections 806. The linear lamps 800a are infrared (IR) halogen lamps. The linear bulb 802 is a cylindrical bulb with a filament (not shown) disposed therein. The linear bulb 802 is configured to emit a radiative energy, such as IR light, towards substrate 102 when positioned within the deposition chamber 100.

The one or more arms 804 extend from the linear bulb 802. As shown in FIG. 8A, there are two arms 804 and one arm extends from each distal end of the linear bulb 802. The two arms 804 extend in a direction perpendicular to the direction in which the linear bulb 802 extends. The two arms 804 extend in the same direction and are configured to pass through the holes 408, 508, 608, 708. At the end of each of the arms 804 is an electrical connection 806. The electrical connection 806 is configured to be plugged into or coupled to a socket or other power source. The electrical connections 806 are electrically coupled to a filament within the linear bulb 802 and enable the linear lamp 800a to be powered.

FIG. 8B illustrates a curved lamp 800b for use within the deposition chamber of FIG. 1. The curved lamp 800b may be used in any of the embodiments of FIGS. 2A-3B. The curved lamp 800b includes a curved bulb 808, one or more arms 810, and one or more electrical connections 812. The curved bulb 808 is a tubular bulb shaped to form at least a portion of a ring; e.g., arcuate. The curved bulb 808 includes a filament (not shown) disposed therein. The curved bulb 808 is configured to emit a radiative energy towards substrate 102 when positioned within the deposition chamber 100.

The one or more arms 810 extend from the curved bulb 808. As shown in FIG. 8B, there are two arms 810, and one arm extends from each distal end of the curved bulb 808 orthogonal to a plane of the curved bulb 808. The two arms 810 extend in a direction perpendicular to the direction in which the curved bulb 808 extends. The two arms 810 extend in the same direction and are configured to pass through the holes 208, 308. At the end of each of the arms 810 is an electrical connection 812. The electrical connection 812 is configured to be plugged into or coupled to a socket or other power source. The electrical connections 812 are electrically coupled to a filament within the curved bulb 808 and enable the curved lamp 800b to be powered.

Embodiments described herein enable more controlled heating of a substrate with less heat cycling and longer lamp lifecycles. Each of the groove rings having multiple zones enables greater control of irradiance peaks across different radial positions of the substrate. The distribution of the grooves and subsequent lamps disposed therein is further configured to reduce the heat cycling of locations on the substrate. Reducing the heat cycling reduces both the frequency and intensity of hot/cold spots on the substrate compared to other linear lamp arrangements.

While the foregoing is directed to embodiments of the present disclosure, other and further embodiments of the disclosure may be devised without departing from the basic scope thereof, and the scope thereof is determined by the claims that follow.

What is claimed is:

1. A lamp module suitable for semiconductor substrate processing, comprising:
a reflector body;
one or more first grooves disposed within a first surface of the reflector body, each of the first grooves configured to receive a linear lamp; and
one or more second grooves disposed within the first surface of the reflector body, each of the second grooves configured to receive a linear lamp, the one or more first grooves and the one or more second grooves forming a first ring of grooves about a central axis,
wherein each of the first grooves and the second grooves extends along an arc of less than 180 degrees about the central axis, and
wherein a cross sectional shape of the one or more first grooves being different than a cross sectional shape of the one or more second grooves.

2. The lamp module of claim 1, further comprising one or more third grooves disposed radially outward of the one or more first grooves and the one or more second grooves, the one or more third grooves forming at least a portion of a second ring.

3. The lamp module of claim 1, wherein each of the first grooves and the second grooves are linear grooves.

4. The lamp module of claim 1, wherein there are 2 to 10 first grooves.

5. The lamp module of claim 1, wherein the reflector body comprises one or a combination of copper, nickel, brass, bronze, silver, gold, or aluminum.

6. The lamp module of claim 1, wherein each of the first grooves have a linear groove length of about 35 mm to about 175 mm.

7. The lamp module of claim 1, wherein each of the first grooves and the second grooves includes at least one hole therein, each of the holes passing from a groove wall to a second surface of the reflector body opposite the first surface.

8. The lamp module of claim 1, further comprising an opening through the reflector body, the opening extending from the first surface to a second surface and disposed inside the first ring of grooves.

9. A lamp module suitable for semiconductor substrate processing, comprising:
a reflector body;

one or more first grooves disposed within a first surface of the reflector body, each of the first grooves configured to receive one or more linear lamps;

one or more second grooves disposed within the first surface of the reflector body, each of the second grooves configured to receive one or more linear lamps;

one or more third grooves disposed within the first surface of the reflector body; and one or more fourth grooves disposed within the first surface of the reflector body, wherein, the one or more first grooves and the one or more second grooves are oriented to form at least a portion of a first ring while the one or more third grooves and the one or more fourth grooves are oriented to form at least a portion of a second ring circumscribing the first ring, wherein the one or more first grooves has a different cross sectional shape than the one or more second grooves, wherein each of the one or more first grooves and each of the one or more second grooves comprises a plurality of individual grooves arranged along an arc about a central axis, wherein each individual groove extends along a curved length of less than 180 degrees about the central axis, and wherein each individual groove includes at least two holes passing from a groove wall to a second surface of the reflector body opposite the first surface, the at least two holes being located at proximate distal ends of the individual groove.

10. The lamp module of claim 9, wherein the one or more third grooves has a different cross sectional shape than the one or more fourth grooves.

11. The lamp module of claim 9, wherein for each individual groove the holes consist of exactly two holes positioned at opposing distal ends of the individual groove.

12. The lamp module of claim 9, wherein the one or more first grooves form a first semicircle and the one or more second grooves form a second semicircle.

13. The lamp module of claim 9, wherein the first surface of the reflector body has a reflectivity of greater than about 90%.

14. The lamp module of claim 9, wherein a portion of each of the one or more first grooves and the one or more second grooves has a linear length.

15. The lamp module of claim 9, wherein each of the one or more first grooves and the one or more second grooves of the first ring are disposed within a zone with an annular radius of less than 30 mm.

16. A lamp module suitable for semiconductor substrate processing, comprising:

a reflector body;

one or more first grooves disposed within a first surface of the reflector body;

one or more second grooves disposed within the first surface of the reflector body;

one or more third grooves disposed within the first surface of the reflector body; and one or more fourth grooves disposed within the first surface of the reflector body, wherein, the one or more first grooves and the one or more second grooves are oriented to form at least a portion of a first ring, the one or more third grooves and the one or more fourth grooves oriented to form at least a portion of a second ring circumscribing the first ring, and the one or more first grooves having a different cross sectional shape than the one or more second grooves, wherein each of the one or more first grooves and the one or more second grooves is a curved groove extending along an arc of less than 180 degrees about a central axis.

17. The lamp module of claim 16, wherein each of the one or more third grooves and the one or more fourth grooves are curved grooves.

18. The lamp module of claim 16, wherein the one or more first grooves are connected to the one or more second grooves.

19. The lamp module of claim 16, wherein each of the first grooves and the second grooves includes at least one hole therein, each of the holes passing from a groove wall to a second surface of the reflector body opposite the first surface.

20. The lamp module of claim 16, wherein the first surface of the reflector body has a reflectivity of greater than about 90%.

\* \* \* \* \*